US009584694B2

(12) United States Patent
Ito et al.

(10) Patent No.: US 9,584,694 B2
(45) Date of Patent: Feb. 28, 2017

(54) PREDETERMINED-AREA MANAGEMENT SYSTEM, COMMUNICATION METHOD, AND COMPUTER PROGRAM PRODUCT

(71) Applicants: Yoichi Ito, Tokyo (JP); Toshiyuki Terashita, Tokyo (JP); Noriyuki Terao, Miyagi (JP); Yoshiaki Irino, Kanagawa (JP); Tomonori Tanaka, Kanagawa (JP); Nozomi Imae, Kanagawa (JP); Toru Harada, Kanagawa (JP); Hirokazu Takenaka, Kanagawa (JP); Hideaki Yamamoto, Kanagawa (JP); Kensuke Masuda, Kanagawa (JP); Satoshi Sawaguchi, Kanagawa (JP); Daisuke Bessho, Kanagawa (JP); Hiroyuki Satoh, Kanagawa (JP); Makoto Shohara, Tokyo (JP)

(72) Inventors: Yoichi Ito, Tokyo (JP); Toshiyuki Terashita, Tokyo (JP); Noriyuki Terao, Miyagi (JP); Yoshiaki Irino, Kanagawa (JP); Tomonori Tanaka, Kanagawa (JP); Nozomi Imae, Kanagawa (JP); Toru Harada, Kanagawa (JP); Hirokazu Takenaka, Kanagawa (JP); Hideaki Yamamoto, Kanagawa (JP); Kensuke Masuda, Kanagawa (JP); Satoshi Sawaguchi, Kanagawa (JP); Daisuke Bessho, Kanagawa (JP); Hiroyuki Satoh, Kanagawa (JP); Makoto Shohara, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 305 days.

(21) Appl. No.: 14/095,176

(22) Filed: Dec. 3, 2013

(65) Prior Publication Data
US 2014/0152852 A1 Jun. 5, 2014

(30) Foreign Application Priority Data

Dec. 5, 2012 (JP) ................................. 2012-266371

(51) Int. Cl.
*H04N 1/21* (2006.01)
*H04N 1/00* (2006.01)
(Continued)

(52) U.S. Cl.
CPC ....... *H04N 1/2166* (2013.01); *H04N 1/00137* (2013.01); *H04N 1/00148* (2013.01);
(Continued)

(58) Field of Classification Search
CPC .... H04N 1/00; H04N 1/00204; H04N 1/0084; H04N 5/232; H04N 5/772;
(Continued)

(56) References Cited

U.S. PATENT DOCUMENTS 5,990,941 A * 11/1999 Jackson ........... G08B 13/19626
348/147
6,323,862 B1 * 11/2001 Oxaal .................... G03B 37/02
345/427
(Continued)

FOREIGN PATENT DOCUMENTS

JP 2001-285894 10/2001
JP 2004-078037 3/2004
(Continued)

OTHER PUBLICATIONS

Office Action mailed Sep. 20, 2016, in Japanese Patent Application No. 2012-266371.

*Primary Examiner* — Chikaodili E Anyikire
*Assistant Examiner* — Dramos I Kalapodas
(74) *Attorney, Agent, or Firm* — Oblon, McClelland, Maier & Neustadt, L.L.P.

(57) ABSTRACT

A predetermined-area management system is configured to communicate with a communication terminal. The predetermined-area management system includes: a storage unit that stores image identification information for identifying
(Continued)

image data and predetermined-area information for identifying a predetermined area in the image data in association with each other; a receiving unit that receives image identification information that is transmitted from the communication terminal; an extraction unit that searches the storage unit by using the image identification information received by the receiving unit so as to extract associated predetermined-area information; and a transmitting unit that transmits, to the communication terminal, the predetermined-area information extracted by the extraction unit.

8 Claims, 27 Drawing Sheets

(51) Int. Cl.
| | | |
|---|---|---|
| H04N 1/32 | (2006.01) | |
| H04N 5/225 | (2006.01) | |
| H04N 13/02 | (2006.01) | |
| G06F 3/00 | (2006.01) | |

(52) U.S. Cl.
CPC . *H04N 1/32122* (2013.01); *H04N 2201/3225* (2013.01); *H04N 2201/3226* (2013.01); *H04N 2201/3274* (2013.01); *H04N 2201/3278* (2013.01)

(58) Field of Classification Search
CPC ............. H04N 1/00206; H04N 1/2116; H04N 1/2166; H04N 2201/3225; H04N 2201/3278; H04N 2201/3274; H04N 2201/3226; H04N 1/00137; H04N 1/32122; H04N 1/00148; H04N 21/854; H04N 21/41407; H04N 21/251; H04N 5/23238; H04N 7/142; H04N 7/148; H04N 5/225; H04N 13/02; H04N 2101/00; H04N 2201/0084; A61B 5/7445; A61B 5/055; G06T 3/0025; G06T 3/0062; G06T 1/00; G06T 11/60; G06Q 30/0261; G06F 17/3087; G06F 17/30259; G06F 17/30277; G06F 3/04842; G06F 17/30905; G06F 19/00; G06F 17/30; G06K 9/00221; G06K 9/00228; H04L 67/2828; H04L 67/04; H04L 67/2823; G08G 1/005; G09B 29/10; G01C 21/26; G01C 21/3647; G01C 21/3697
See application file for complete search history.

(56) References Cited

U.S. PATENT DOCUMENTS

| | | | | |
|---|---|---|---|---|
| 7,203,367 | B2* | 4/2007 | Shniberg | G06F 17/30259 382/224 |
| 7,725,604 | B1* | 5/2010 | Levenberg | G06F 17/30905 709/231 |
| 8,006,201 | B2* | 8/2011 | Bhattacharya | G11B 27/105 715/716 |
| 8,621,351 | B2* | 12/2013 | Runstedler | G06F 3/0482 715/719 |
| 8,683,005 | B1* | 3/2014 | Raj | H04L 67/2842 455/414.1 |
| 2001/0017656 | A1* | 8/2001 | Araki | H04N 7/142 348/211.99 |
| 2003/0030636 | A1* | 2/2003 | Yamaoka | G06T 1/0007 345/419 |
| 2006/0173904 | A1* | 8/2006 | Nakajima | G06F 17/30011 |
| 2007/0283277 | A1* | 12/2007 | Hayakawa | G06F 3/0481 715/748 |
| 2008/0030792 | A1* | 2/2008 | Shiiyama | G06F 17/30265 358/402 |
| 2009/0132952 | A1* | 5/2009 | Wong | G06F 3/0481 715/781 |
| 2009/0154833 | A1* | 6/2009 | Sakaue | B41J 2/175 382/282 |
| 2009/0313124 | A1* | 12/2009 | Miranda | G01C 21/3647 705/14.58 |
| 2011/0129139 | A1* | 6/2011 | Numata | G07D 7/0006 382/137 |
| 2012/0045149 | A1* | 2/2012 | Arai | H04N 7/183 382/296 |
| 2012/0162357 | A1* | 6/2012 | Okegawa | G06T 3/0062 348/36 |
| 2012/0214590 | A1* | 8/2012 | Newhouse | G06F 3/011 463/31 |
| 2012/0242798 | A1* | 9/2012 | McArdle | H04N 21/23412 348/46 |
| 2012/0246184 | A1* | 9/2012 | Rothschild | G06F 17/30047 707/758 |
| 2014/0022333 | A1* | 1/2014 | Okita | H04L 47/12 348/14.08 |
| 2014/0025291 | A1* | 1/2014 | Lee | G01C 21/3682 701/454 |
| 2014/0132788 | A1* | 5/2014 | Ramsay | H04N 5/23238 348/218.1 |

FOREIGN PATENT DOCUMENTS

| | | | | |
|---|---|---|---|---|
| JP | 2004078037 | * | 3/2004 | ............ G06F 19/00 |
| JP | 2008-243027 | | 10/2008 | |
| JP | 2008243027 | * | 10/2008 | ............ G01C 21/00 |
| JP | 2011-120201 | | 6/2011 | |
| JP | 2011-215412 | | 10/2011 | |
| JP | 2011215412 | * | 10/2011 | ............ G01C 21/26 |

* cited by examiner

FIG.4
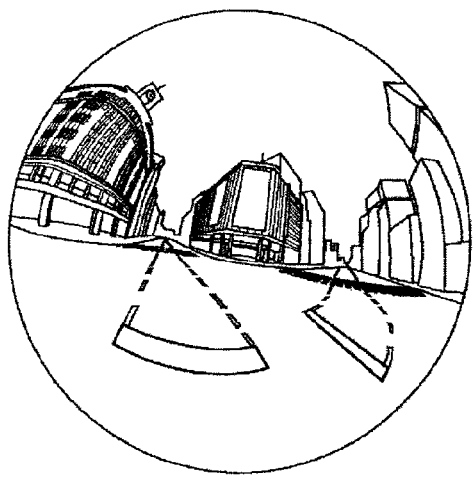
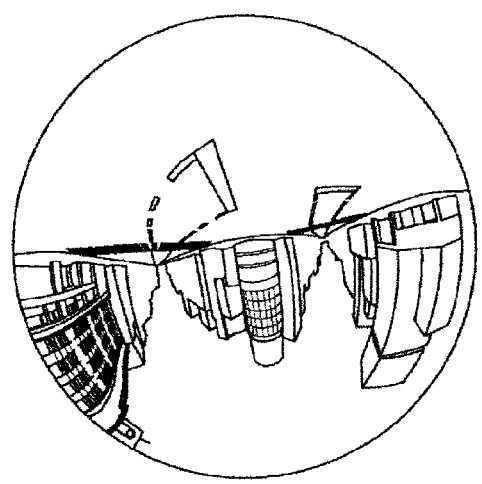
HEMISPHERIC IMAGE
(FRONT SIDE)
(a)
HEMISPHERIC IMAGE
(BACK SIDE)
(b)
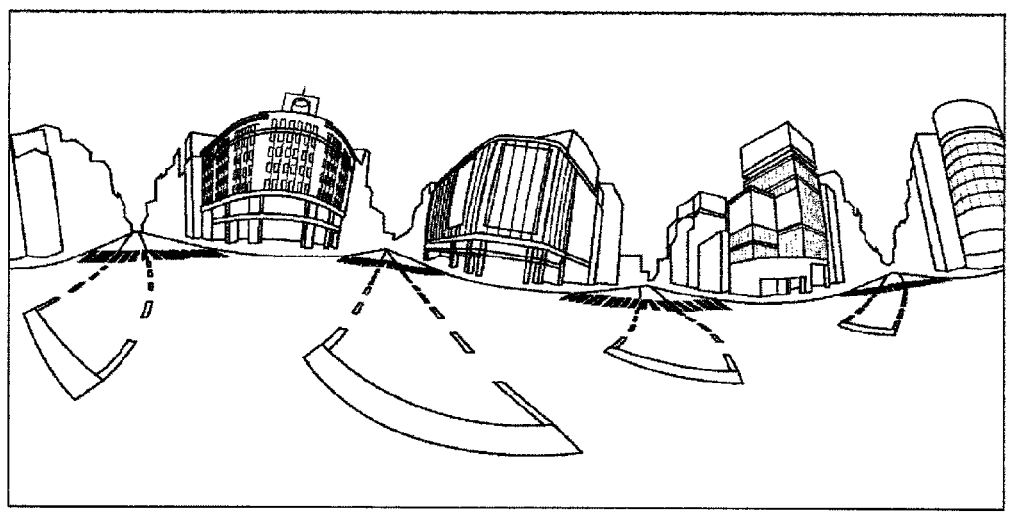
CAPTURED IMAGE
(MERCATOR IMAGE)
(c)

FIG.5
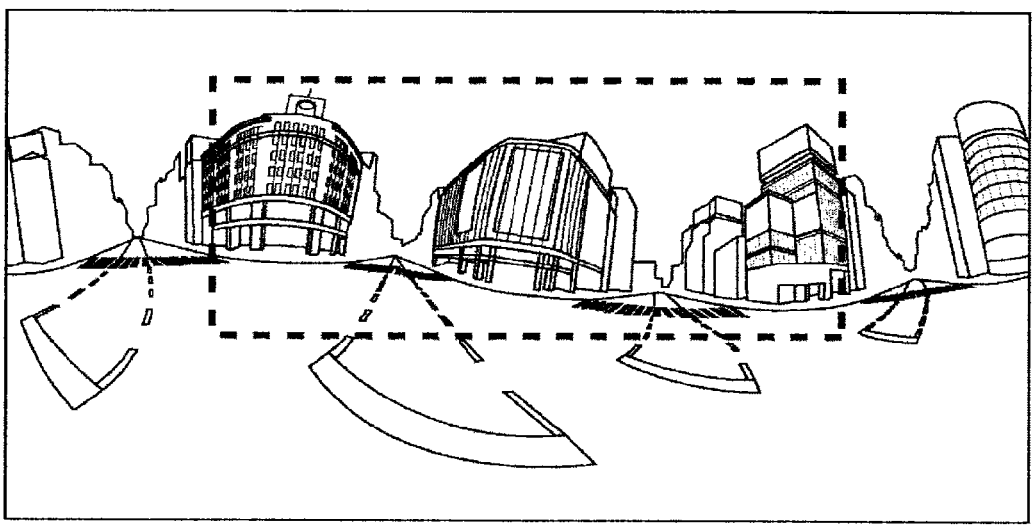
CAPTURED IMAGE
(MERCATOR IMAGE)
(a)
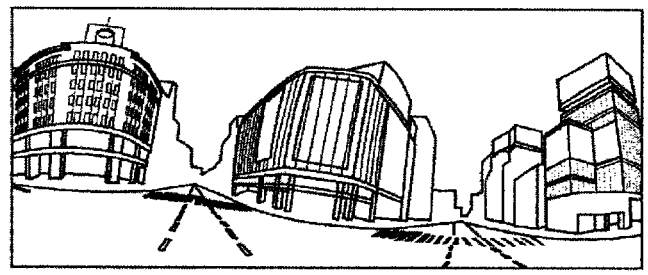
SHARED SELECTION IMAGE
(b)

FULLY-SPHERICAL
PANORAMIC IMAGE

FIG.16

| USER IDENTIFICATION INFORMATION | | IMAGE IDENTIFICATION INFORMATION | | | | | | |
|---|---|---|---|---|---|---|---|---|
| USER ID | USER NAME | IMAGE ID | FILE NAME | URL | ATTRIBUTE INFORMATION | COMMENT ID | COMMENT | COMMENT |
| u100001 | James | au1415ifauy | IMAGE OF TRAFFIC INTERSECTION | http://...... | name" photo", height" 480", width" 640" | 1234 | IMAGE OF FIRST BUILDING | 20/12/2012, 16:38 |
| u100002 | Kurt | au1416ifauy | LANDSCAPE | http://...... | name" photo", height" 1024", width" 2048" | 5678 | IT IS BEAUTIFUL | 25/12/2012, 12:30 |
| ... | ... | ... | ... | ... | ... | ... | ... | ... |

FIG.17

USER IDENTIFICATION INFORMATION

| u100001, u100002, u100003 |
| u200001, u200002, u200003, u200004 |
| ⋮ |

FIG.18

USER IDENTIFICATION INFORMATION / ALBUM IDENTIFICATION INFORMATION

| USER ID | USER NAME | ALBUM ID |
|---|---|---|
| u100001 | James | a1001, a1002 |
| u100002 | Kurt | a2001, |
| u100002 | Mary | a3001, a3002, a3003 |
| ⋮ | ⋮ | ⋮ |

FIG.19

ALBUM IDENTIFICATION INFORMATION / IMAGE IDENTIFICATION INFORMATION

| ALBUM ID | ALBUM NAME | IMAGE ID |
|---|---|---|
| a1001 | ALBUM 11 | au1415ifauy, au1416ifauy,... |
| a1002 | ALBUM 12 | ... |
| a2001 | ALBUM 21 | ... |
| ⋮ | ⋮ | ⋮ |

```
{
"photo_id" : "au1415ifauy"
"name" : "IMAGE OF FIRST BUILDING"
"picture" : "http://example.facenote.com/appname/123456789.jpg",
"height" : 480,
"width" : 640,
}
```

FIG.23

```
{
"https://apps.facenote.com/appname/987654321/rH100rV100angle35"
  "data" : [
    {
      "id" : "1234"
      "from" : {
        "name" : "James",
        "id" : "u100001"
      },
      "message" : "Nice",
      "created_time" : "2012-12-20T16:03+0000"
    },
}
```

FIG.25

```
{
"rH" : "100"
"rV" : "100"
"angle" : "35"
"gp" : "au1415ifauy",
}
```

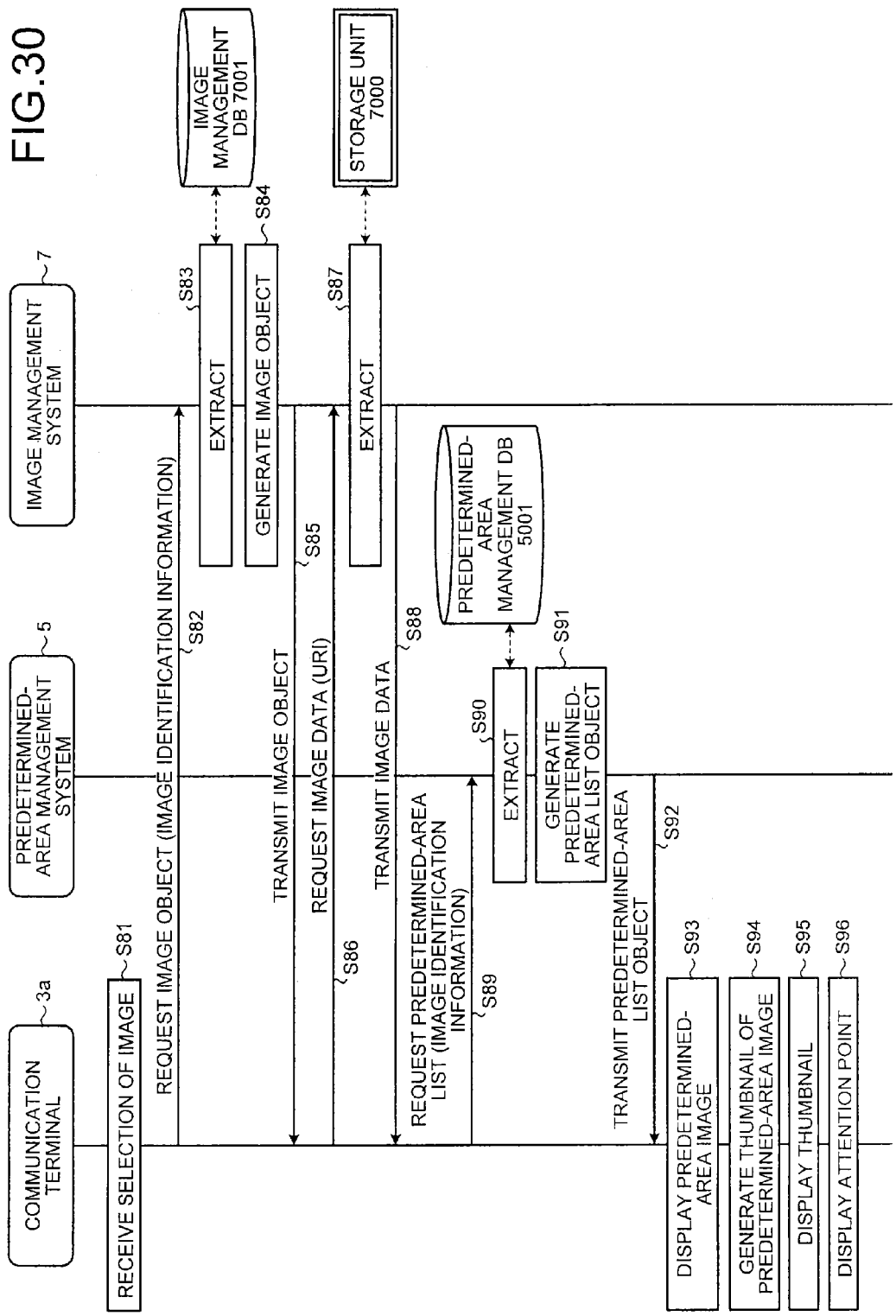

FIG.31

```
{
"photo_id" : "au1415ifauy",
  "name" : "IMAGE OF FIRST BUILDING",
  "picture" : "http://example.facenote.com/appname/123456789.jpg",
  "height" : "480",
  "width" : 640,
  "comments" : {
    "data" : [
      {
        "id" : "1234",
        "from" : {
          "name" : "James",
          "id" : "u100001"
        },
        "message" : "Nice)",
        "created_time" : "2012-12-20T16:03+0000"
      },
}
```

FIG.32

```
{
  "title" : "00000001.HDR",
  "gazingpoints" : [
    {
      "rH" : "100",
      "rV" : "100",
      "angle" : "35",
      "gp" : "https://apps.facenote.com/appname/987654321/rH100rV100angle35",
    },
    {
      "highlight_id" : "402368546"
      "rH" : "230",
      "rV" : "439",
      "angle" : "35",
      "gp" : "https://apps.facenote.com/appname/987654321/rH230rV439angle35",
    },
  ]
```

PREDETERMINED-AREA MANAGEMENT SYSTEM, COMMUNICATION METHOD, AND COMPUTER PROGRAM PRODUCT

CROSS-REFERENCE TO RELATED APPLICATIONS

The present application claims priority to and incorporates by reference the entire contents of Japanese Patent Application No. 2012-266371 filed in Japan on Dec. 5, 2012.

BACKGROUND OF THE INVENTION

1. Field of the Invention

The present invention relates to a predetermined-area management system that is configured to communicate with a predetermined communication terminal, a communication method performed by the predetermined-area management system, and a computer program for implementing the communication method.

2. Description of the Related Art

Recently, systems have been provided to share the same image with multiple users, where the image captured by a digital camera, or the like, is uploaded by a user into an image management server on the Internet and the image is downloaded from the image management server by another user (see Japanese Patent Application Laid-open No. 2011-120201).

In addition, social networking services (SNSs), such as Facebook, have rapidly become popular. In the SNS, users can post their comments with respect to shared images, and multiple users can view the comments.

Here, an explanation is given of the above-described comments with reference to FIG. 33. As illustrated in FIG. 33, with regard to the image of the traffic intersection that is uploaded by a user A, if a user B desires to bring sharers' attention to part of the image of the traffic intersection (here, "the image of a first building"), the user B can post the part of the image as his/her comment. Furthermore, if the user B desires to bring sharers' attention to part of the image of the traffic intersection (here, "the image of a second building"), the user B can post the part of the image as his/her comment. Thus, as illustrated in FIG. 33, sharers can view the posted comments.

As illustrated in FIG. 33, a hyperlink is attached to each of "the image of the traffic intersection", "the image of the first building", and "the image of the second building" so as to enable access to the image data that is managed by the image management server of the SNS.

However, in the image management server of most of the SNSs including Facebook, comments are only linked to image data. Specifically, as illustrated in FIG. 34, each of a comment 1001 for referring the image of the first building for attention and a comment 1002 for referring the image of the second building for attention is only unidirectionally associated with image data 1000 for presenting the image of the traffic intersection. Therefore, users are not allowed to access the comment 1001 or the comment 1002 from the image data 1000 nor access the comment 1002 from the comment 1001.

Under such a circumstance, a problem occurs in that, for example, if the user B simply downloads the image data and the comment from the image management server to his/her communication terminal, it is difficult for the communication terminal to display the image data and the image to which the comment is attached such that they are associated with (linked to) each other.

SUMMARY OF THE INVENTION

It is an object of the present invention to at least partially solve the problems in the conventional technology.

A predetermined-area management system is configured to communicate with a communication terminal. The predetermined-area management system includes: a storage unit that stores image identification information for identifying image data and predetermined-area information for identifying a predetermined area in the image data in association with each other; a receiving unit that receives image identification information that is transmitted from the communication terminal; an extraction unit that searches the storage unit by using the image identification information received by the receiving unit so as to extract associated predetermined-area information; and a transmitting unit that transmits, to the communication terminal, the predetermined-area information extracted by the extraction unit.

A communication method is performed by a predetermined-area management system configured to communicate with a communication terminal that transmits image data or a comment for the image data to an image management system that manages the image data and the comment. The predetermined-area management system includes a storage unit that stores image identification information for identifying image data and predetermined-area information for identifying a predetermined area in the image data in association with each other. The communication method includes: receiving image identification information that is transmitted from the communication terminal; extracting associated predetermined-area information by searching the storage unit by using the image identification information received at the receiving; and transmitting, to the communication terminal, the predetermined-area information extracted at the extracting.

A computer program product includes a non-transitory computer-readable medium having computer readable program codes embodied in the medium for processing information in a predetermined-area management system configured to communicate with a communication terminal that transmits image data or a comment for the image data to an image management system that manages the image data and the comment. The predetermined-area management system includes a storage unit that stores image identification information for identifying image data and predetermined-area information for identifying a predetermined area in the image data in association with each other. The program codes when executed causes the computer to execute: receiving image identification information that is transmitted from the communication terminal; extracting associated predetermined-area information by searching the storage unit by using the image identification information received at the receiving; and transmitting, to the communication terminal, the predetermined-area information extracted at the extracting.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4(a) is a diagram that illustrates a hemispheric image (front) captured by the image capturing device, FIG. 4(b) is a diagram that illustrates a hemispheric image (back) captured by the image capturing device, and FIG. 4(c) is a diagram that illustrates an image represented by using the Mercator projection;

FIG. 5(a) is a diagram that illustrates an image represented by using the Mercator projection and the area of a shared selection image, and FIG. 5(b) is a diagram that illustrates the shared selection image;

FIGS. 10(a) and 10(b) are diagrams that illustrate a predetermined-area image;

FIG. 16 is a conceptual diagram that illustrates an image management table;

FIG. 17 is a conceptual diagram that illustrates a related-person management table;

FIG. 18 is a conceptual diagram that illustrates an album management table;

FIG. 19 is a conceptual diagram that illustrates an in-album image management table;

FIG. 23 is a diagram that illustrates the details of a comment object;

FIG. 25 is a diagram that illustrates the details of a predetermined-area object;

FIG. 30 is a sequence diagram that illustrates a process to download image data and a predetermined-area list object;

FIG. 31 is a diagram that illustrates the details of an image object;

FIG. 32 is a diagram that illustrates the details of a predetermined-area list object;

DETAILED DESCRIPTION OF THE PREFERRED EMBODIMENTS

Exemplary embodiments of the present invention are explained in detail below with reference to FIGS. 1 to 32.

Outline of the Embodiment

Figure 1:
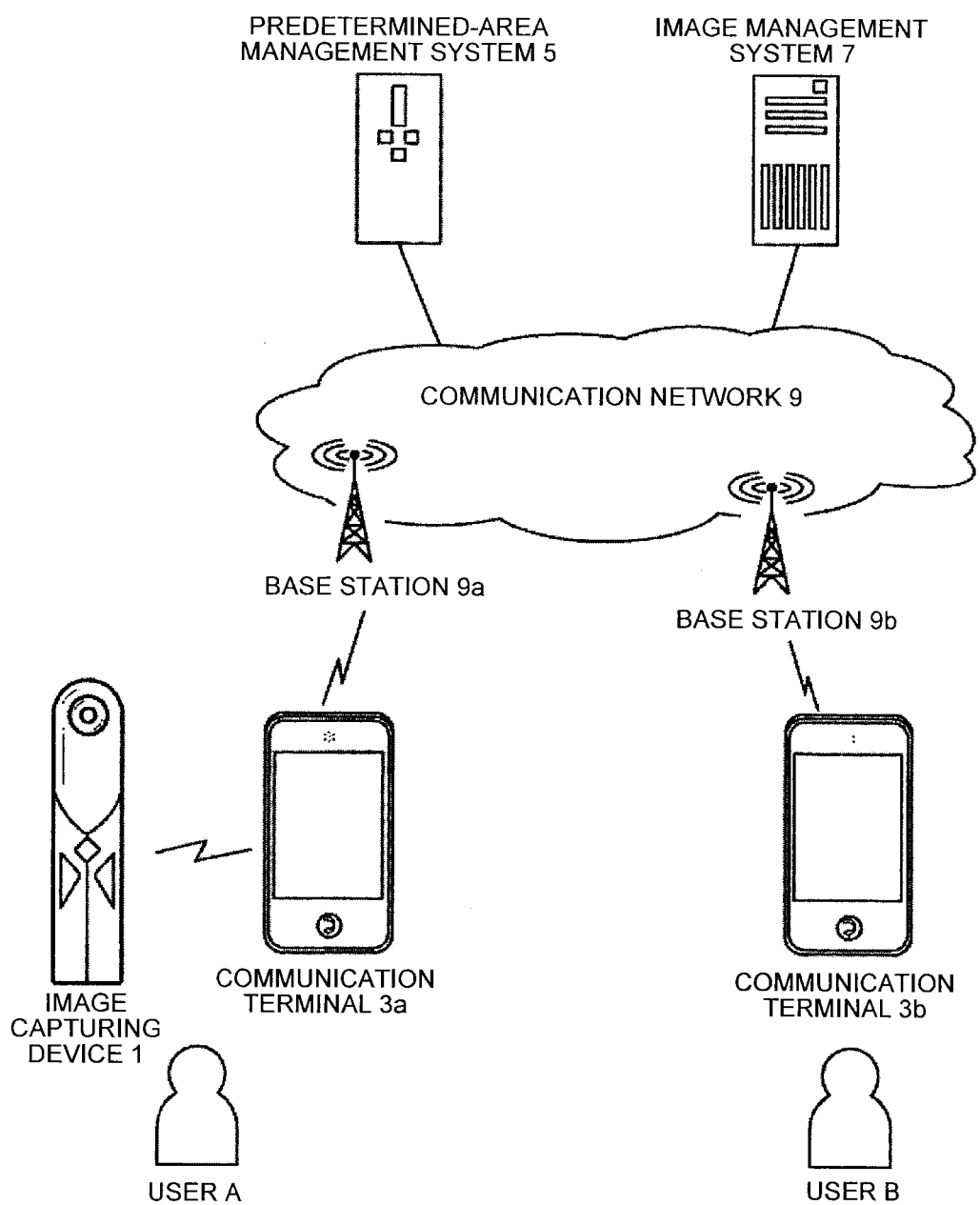
FIG. 1 is a schematic view of an image sharing system according to an embodiment of the present invention.

First, an explanation is given, with reference to FIGS. 1 to 10, of the outline of the present embodiment. FIG. 1 is a schematic view of an image sharing system according to the present embodiment.

As illustrated in FIG. 1, the image sharing system according to the present embodiment is configured by using an image capturing device 1, a plurality of communication terminals (3a, 3b), a predetermined-area management system 5, and an image management system 7. Furthermore, the communication terminals (3a, 3b) are used by users (A, B), respectively. In an example illustrated in the present embodiment, the image capturing device 1 is operated by the user A. In the following, any communication terminal out of the communication terminals (3a, 3b) is represented as the "communication terminal 3".

The image capturing device 1 is a digital camera that captures fully-spherical panoramic images, also called omnidirectional images. The communication terminal 3 is a computer, such as a smartphone, tablet terminal, notebook PC, desktop PC, or Personal Data Assistance (PDA). Furthermore, the predetermined-area management system 5 and the image management system 7 are the server computers.

The image capturing device 1 is capable of communicating with the communication terminal 3 by using a short-range wireless technology in accordance with a Near Field Communication (NFC) standard. Furthermore, the communication terminal 3 is capable of communicating with the predetermined-area management system 5 and the image management system 7 via a communication network 9. The communication network 9 is configured by using a radio communication network, such as 3rd Generation (3G), Worldwide Interoperability for Microwave Access (Wi-MAX), or Long Term Evolution (LTE), base stations (9a, 9b, 9c), and the Internet. A wire communication may be performed between the image capturing device 1 and the communication terminal 3 and between the communication terminal 3 and the communication network 9.

Figure 2:
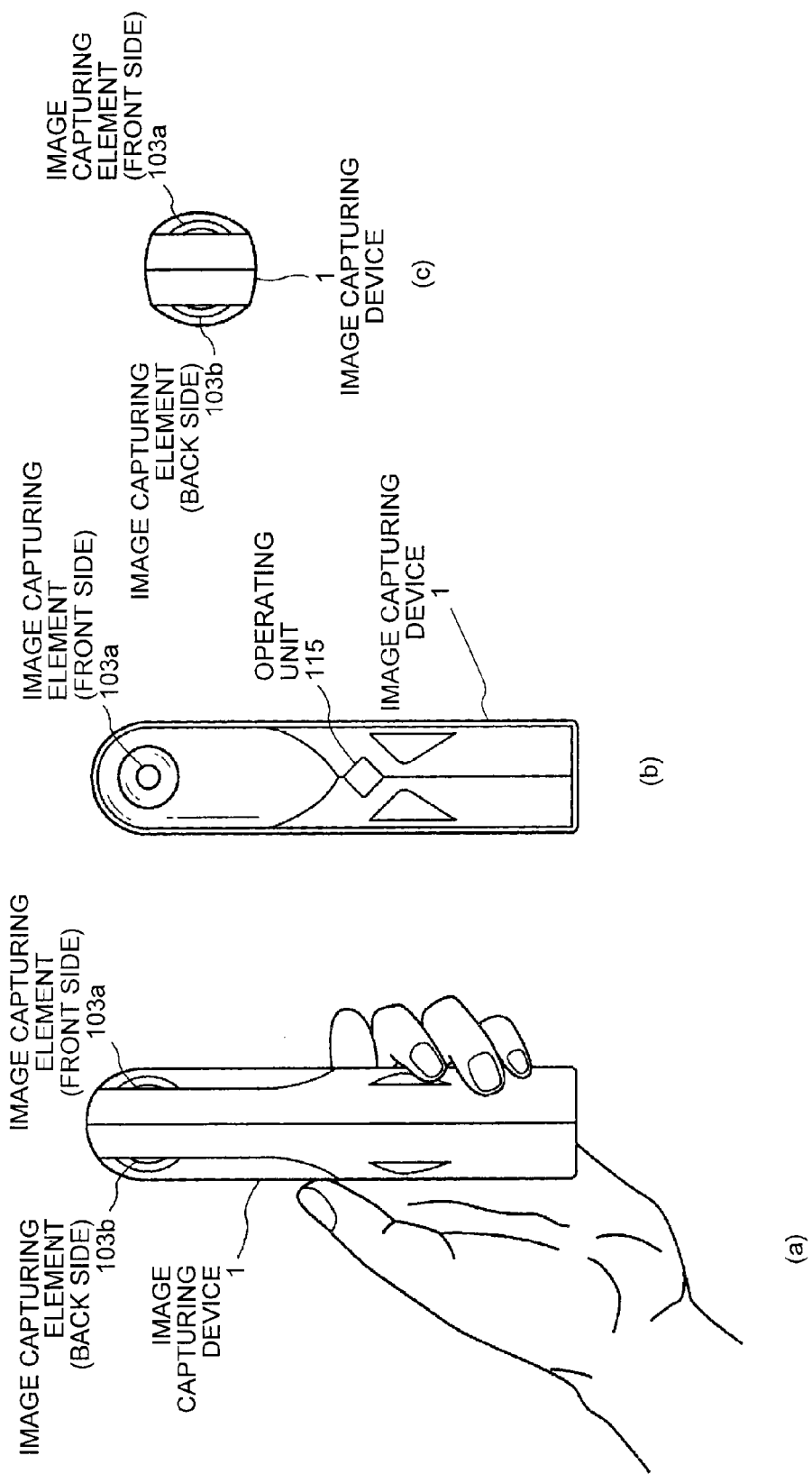
FIG. 2(a) is a left side view of an image capturing device.
FIG. 2(b) is a front view of the image capturing device.
FIG. 2(c) is a plan view of the image capturing device.

Next, an explanation is given, with reference to FIG. 2, of the external of the image capturing device 1. FIG. 2(a) is a left side view of the image capturing device, FIG. 2(b) is a front view of the image capturing device, and FIG. 2(c) is a plan view of the image capturing device.

As illustrated in FIG. 2(a), the image capturing device 1 has a size such that a person is able to hold it with one hand. Furthermore, as illustrated in FIGS. 2(a), 2(b), and 2(c), an image capturing element 103a is provided on the front side (the anterior side) of the upper section of the image capturing device 1, and an image capturing element 103b is provided on the back side (the rear side) thereof. Moreover, as illustrated in FIG. 2(b), an operating unit 115, such as a shutter button, is provided on the front side of the image capturing device 1.

Figure 3:
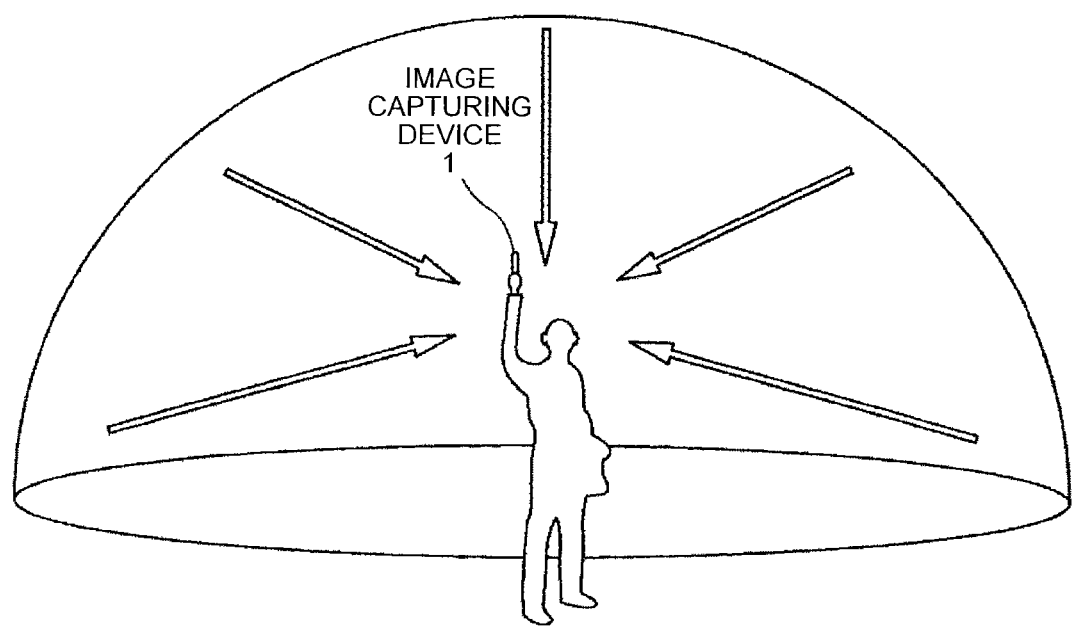
FIG. 3 is an image that illustrates the situation where the image capturing device is used.

Next, an explanation is given, with reference to FIG. 3, of the situation where the image capturing device 1 is used. FIG. 3 is an image that illustrates the situation where the image capturing device is used. As illustrated in FIG. 3, the image capturing device 1 is held by a user's hand and is used to capture images of objects around the user. In this case, images of objects around the user are captured by the image capturing element 103a and the image capturing element 103b that are illustrated in FIG. 2, whereby two hemispheric images can be obtained.

Next, an explanation is given, with reference to FIG. 4, of the images captured by the image capturing device 1 and the combined image. FIG. 4(a) is a diagram that illustrates the hemispheric image (the front side) captured by the image capturing device, FIG. 4(b) is a diagram that illustrates the hemispheric image (the back side) captured by the image capturing device, and FIG. 4(c) is a diagram that illustrates the image represented by using the Mercator projection (hereafter, referred to as a "Mercator image").

As illustrated in FIG. 4(a), the image captured by the image capturing element 103a is the hemispheric image (the front side) that is distorted due to a fish-eye lens 102a, which will be described later. Furthermore, as illustrated in FIG. 4(b), the image captured by the image capturing element 103b is the hemispheric image (the back side) that is distorted due to a fish-eye lens 102b, which will be described later. The hemispheric image (the front side) and the hemispheric image (the back side) that is reversed 180 degrees are combined by the image capturing device 1 so that the Mercator image is generated as illustrated in FIG. 3C.

Figure 6:
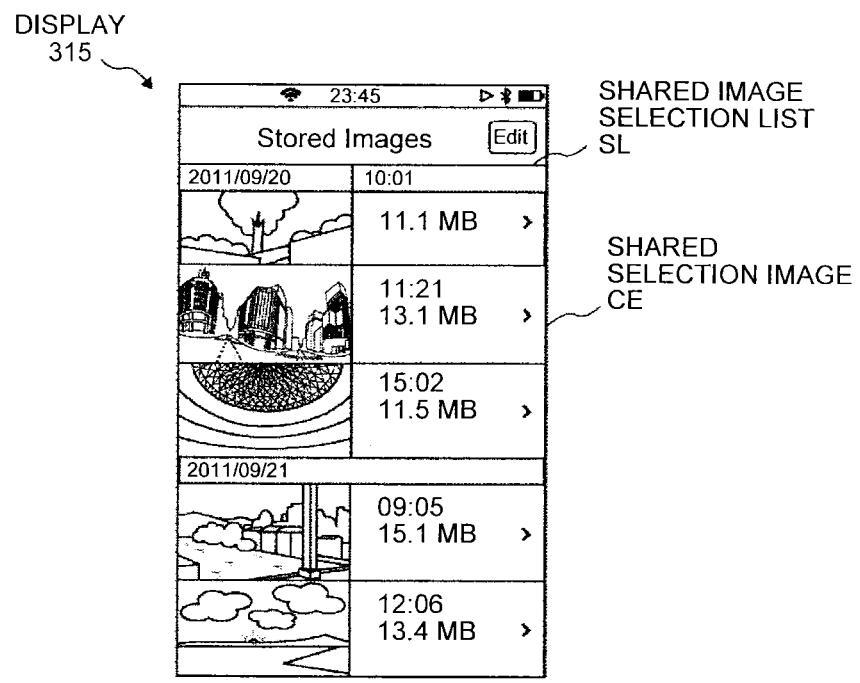
FIG. 6 is a diagram of a captured-image selection list that presents shared selection images.

Next, an explanation is given, with reference to FIGS. 5, and 6, of the relation between a Mercator image and a shared selection image that is used for selecting the image. FIG. 5(a) is a diagram that illustrates a Mercator image and the area of a shared selection image, FIG. 5(b) is a diagram that illustrates the shared selection image. Furthermore, FIG. 6 is a diagram of a captured-image selection list that presents shared selection images.

The area indicated by a dashed line in the Mercator image illustrated in FIG. 5(a) is used so that the shared selection image illustrated in FIG. 5(b) is generated. The shared selection image is transmitted from the image capturing device 1 illustrated in FIG. 1 to the communication terminal 3a. As illustrated in FIG. 6, a shared image selection list SL that presents each shared selection image CE is displayed on a display 315 of the communication terminal 3a, as illustrated in FIG. 6. For example, buildings in a commercial area are displayed as the shared selection image CE, and the image capturing time and date (Sep. 20, 2011, 11:21), the image data size of the captured image (13.1 MB), and the set number (zero) of attention points, which will be described later, are displayed.

Next, when the user A selects the desired shared selection image CE, the communication terminal 3a acquires, from the image capturing device 1, the captured image (the Mercator image) that is related to the shared selection image CE that is selected as described above.

Figure 7:
FIG. 7 is a diagram that illustrates a fully-spherical panoramic image.

With regard to the acquired captured image, Open Graphics Library for Embedded Systems (OpenGL ES) is used in the communication terminal 3a so that the fully-spherical panoramic image illustrated in FIG. 7 is generated from the Mercator image illustrated in FIG. 4(c). OpenGL ES is a graphics library that is used for visualizing two-dimensional (2D) and three-dimensional (3D) data. FIG. 7 is a diagram that illustrates the fully-spherical panoramic image. The fully-spherical panoramic image may be a still image or moving image.

Figure 8:
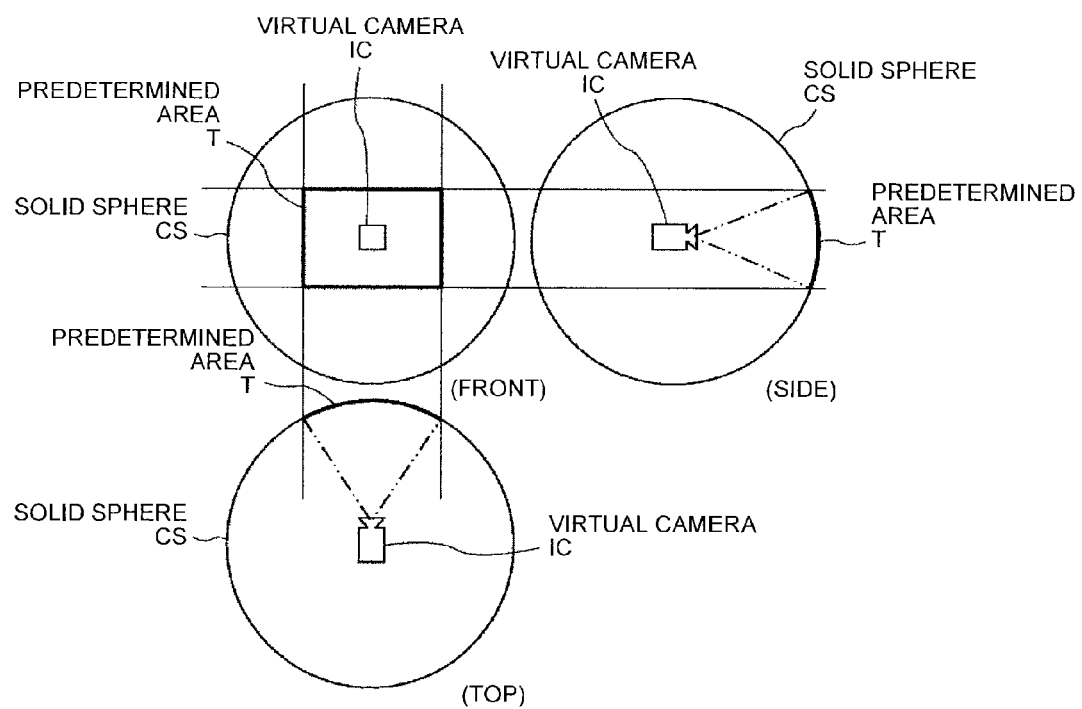
FIG. 8 is a diagram that illustrates a virtual camera and the location of a predetermined area in a case where a fully-spherical panoramic image is a three-dimensional solid sphere.
Figure 9:
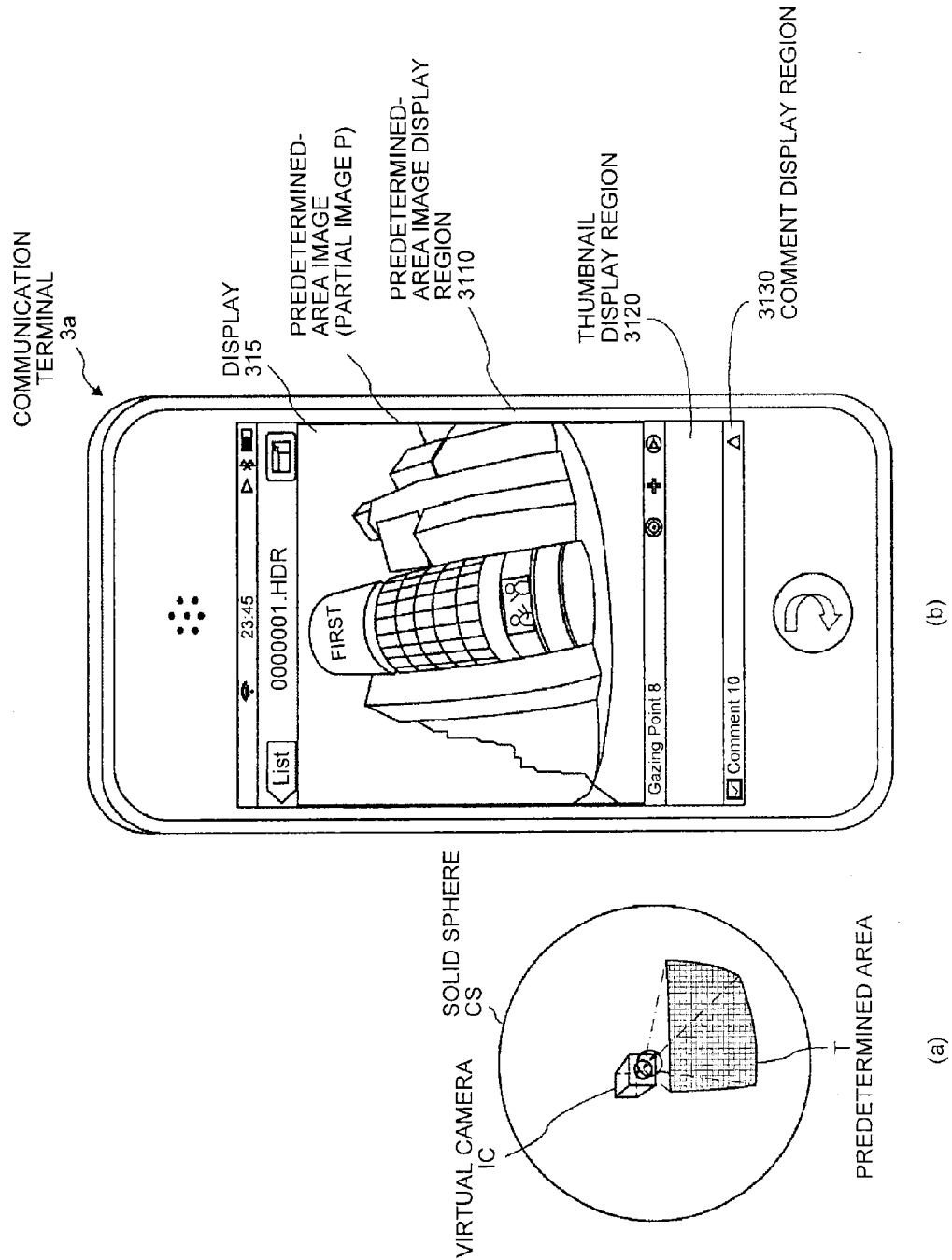
FIG. 9(a) is a three-dimensional perspective view of FIG. 8.
FIG. 9(b) is a diagram that illustrates a communication terminal where a predetermined-area image is presented on a display.
Figure 10:
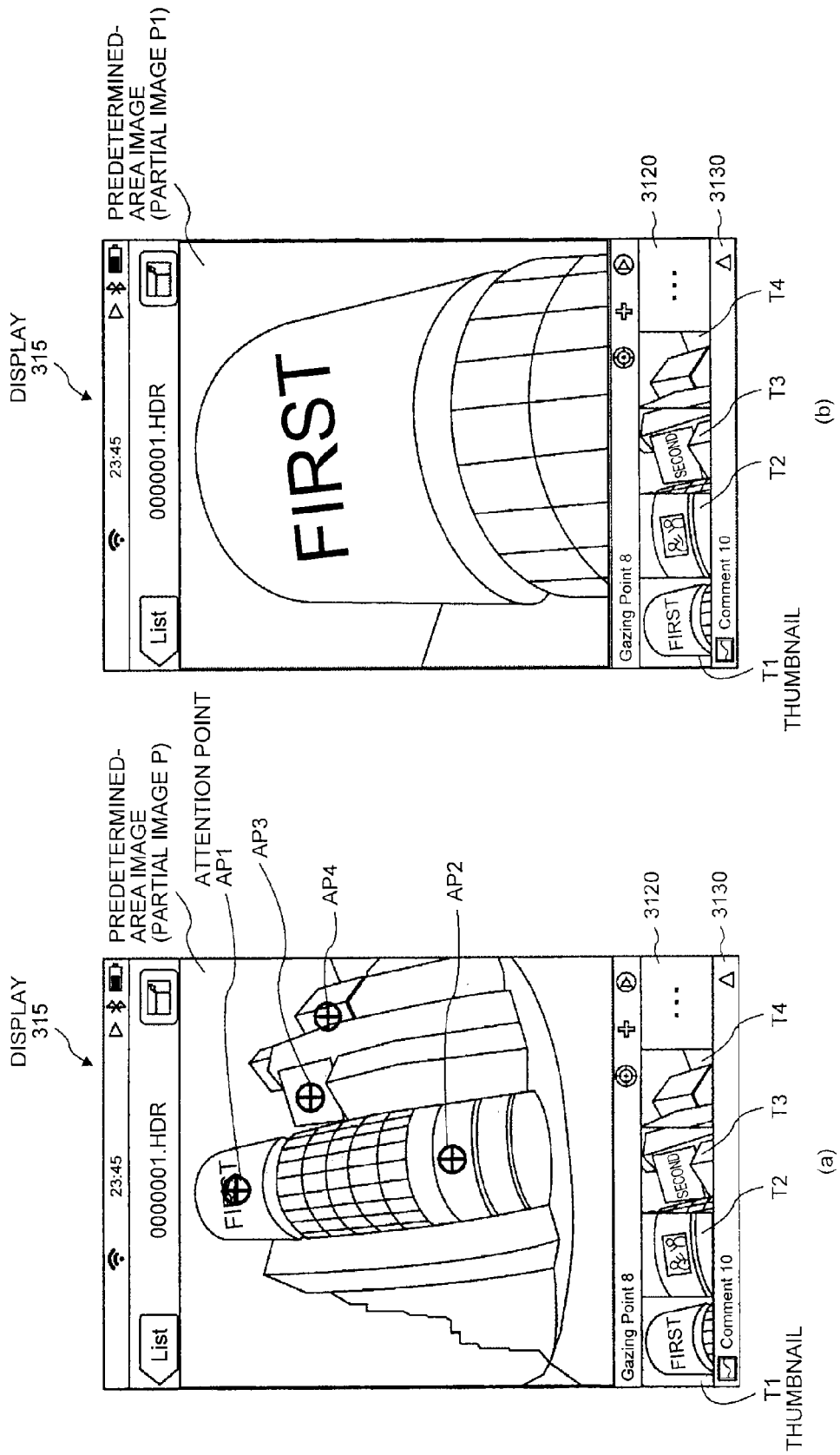
FIG. 10(a) is a diagram that illustrates a predetermined-area image (a partial image P) that indicates each attention point.
FIG. 10(b) is a diagram that illustrates a predetermined-area image (a partial image P1) that includes an arbitrary attention point and presents the surroundings of the attention point.

Next, an explanation is given, with reference to FIGS. 8, and 9, of a process to generate and display an image at a predetermined (arbitrary) area (hereafter, referred to as a "predetermined-area image") of a fully-spherical panoramic image. FIG. 8 is a diagram that illustrates a virtual camera and the location of a predetermined area in a case where a fully-spherical panoramic image is a three-dimensional solid sphere. Furthermore, FIG. 9(a) is a three-dimensional perspective view of FIG. 8, and FIG. 9(b) is a diagram that illustrates a communication terminal where a predetermined-area image is presented on the display.

If the fully-spherical panoramic image illustrated in FIG. 7 is a three-dimensional solid sphere CS, a virtual camera IC is located at the center of the fully-spherical panoramic image and can rotate about three axes, i.e., rotate from side to side and up and down about the center and rotate (roll) with respect to the point of view from the center, as illustrated in FIG. 8. A predetermined area T of the fully-spherical panoramic image can be determined by using the x-coordinate (rH) and the y-coordinate (rV) of the location of the virtual camera IC in the fully-spherical panoramic image and the angle of view (angle). Thus, the zoom for the predetermined area T can be achieved by enlarging or reducing the range of the angle of view (the circular arc).

The image at the predetermined area T of the fully-spherical panoramic image illustrated in FIG. 9(a) is displayed as a predetermined-area image on the display 315 of the communication terminal 3a as illustrated in FIG. 9(b). In this case, the predetermined-area image is a partial image P that represents part of the fully-spherical panoramic image. On the display 315 is displayed a predetermined-area image display region 3110 that displays a predetermined-area image, a thumbnail display region 3120 that displays a thumbnail of a predetermined-area image, and a comment display region 3130 that displays a user's comment for a predetermined-area image.

Furthermore, the captured image illustrated in FIG. 4(c) is uploaded from the communication terminal 3a into the image management system 7 via the communication network 9. For example, the user B uses the communication terminal 3b to download the above-described captured image from the image management system 7 via the communication network 9. Thus, each user is able to share the captured image.

Furthermore, as illustrated in FIGS. 10(a) and 10(b), in the image sharing system according to the present embodiment, an attention point to which each user pays attention can be set in a captured image. FIG. 10(a) is a diagram that illustrates the predetermined-area image (the partial image P) that indicates each attention point, and FIG. 10(b) is a diagram that illustrates a predetermined-area image (a partial image P1) that includes an arbitrary attention point and presents the surroundings of the attention point.

As illustrated in FIG. 10(a), the display 315 of the communication terminal 3b displays a plurality of attention points (AP1, AP2, AP3, and AP4) that are given attention and are set by one or more users that use the image sharing system according to the present embodiment. Moreover, a thumbnail (T1, T2, T3, and T4) that is a certain range of the image at the predetermined area T (the predetermined-area image) that includes each attention point (AP1, AP2, AP3, and AP4) is displayed on the lower portion of the display 315. When the user B selects, for example, the thumbnail T1, the predetermined-area image (here, the partial image P1), which is the original image of the thumbnail T1, is displayed on the display 315 as illustrated in FIG. 10(b).

Furthermore, it is possible to set a new attention point in the predetermined-area image illustrated in FIG. 10(b). In this case, the thumbnail of the predetermined-area image that includes the newly set attention point is displayed.

As described above, the communication terminal 3b downloads a captured image; however, this is not a limitation and the communication terminal 3a may download a captured image.

Hardware Configuration According to the Embodiment

Figure 11:
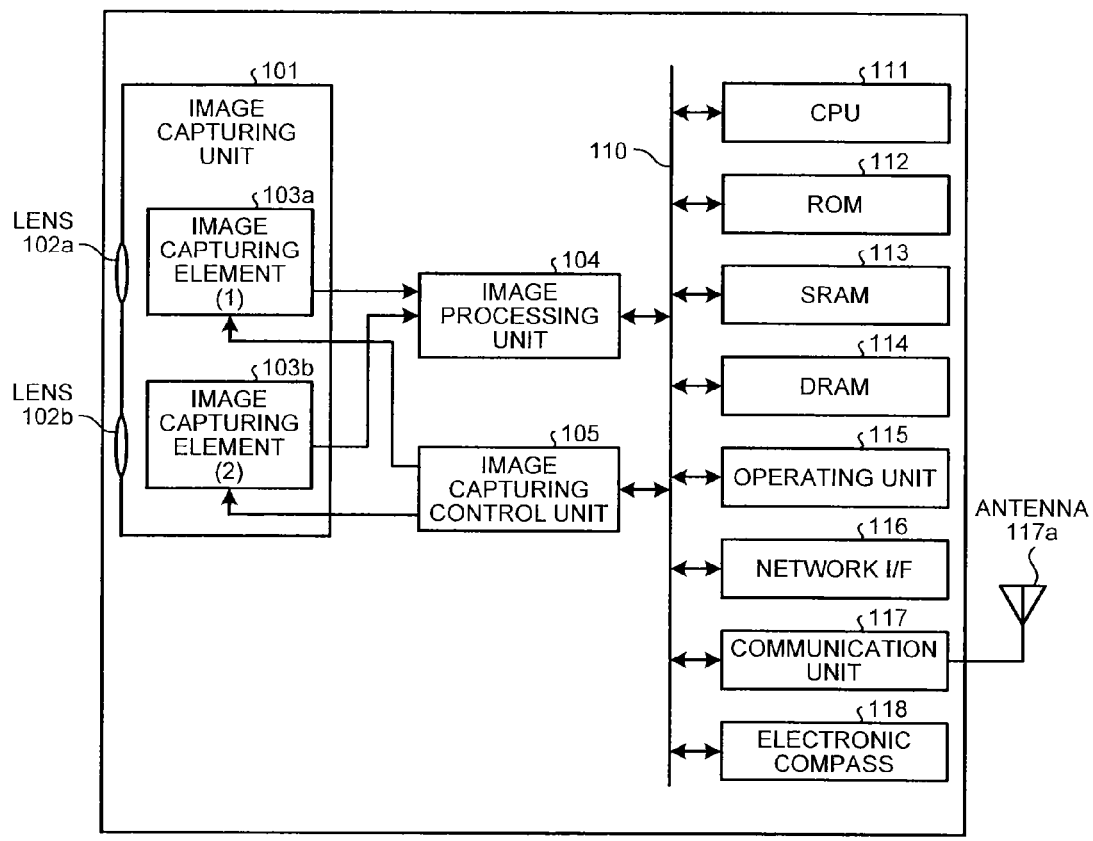
FIG. 11 is a hardware configuration diagram of the image capturing device.
Figure 12:
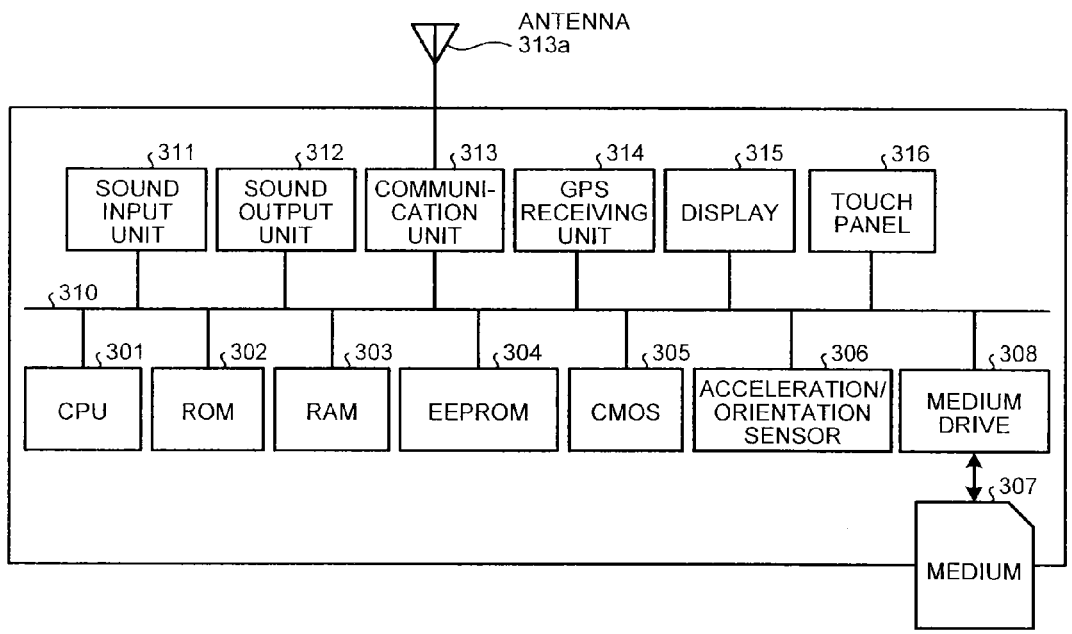
FIG. 12 is a hardware configuration diagram of a communication terminal.
Figure 13:
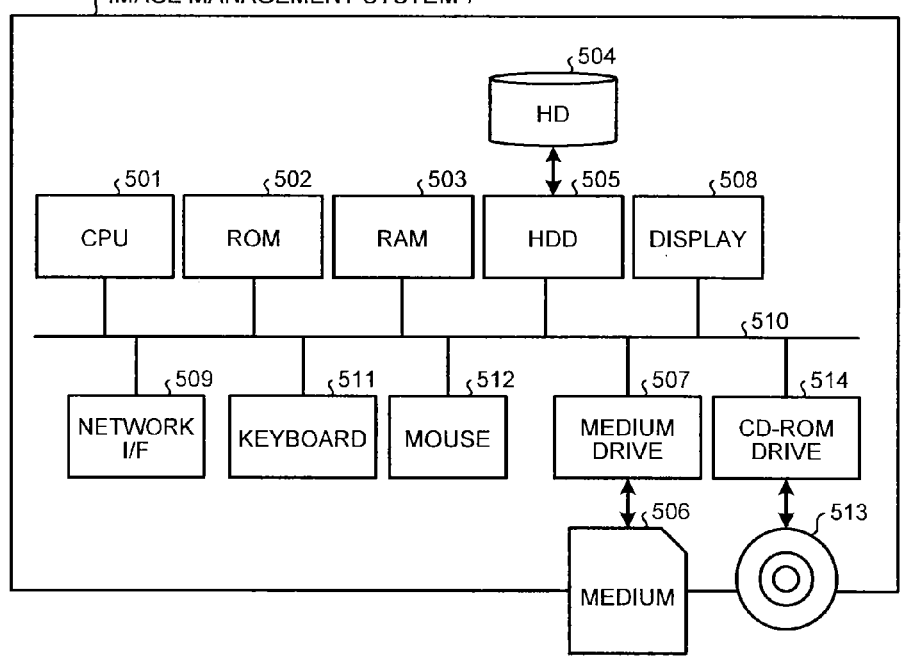
FIG. 13 is a hardware configuration diagram of a predetermined-area management system and an image management system.

Next, a detailed explanation is given, with reference to FIGS. 11 to 13, of hardware configurations of the image capturing device, the communication terminal, the predetermined-area management system, and the image management system according to the present embodiment.

First, an explanation is given, with reference to FIG. 11, of a hardware configuration of the image capturing device 1. FIG. 11 is a hardware configuration diagram of the image capturing device. In the following, the image capturing device 1 is an omnidirectional image capturing device that uses two image capturing elements; however, three or more image capturing elements may be used. Furthermore, the device does not necessarily need to be dedicated to omnidirectional image capturing; therefore, an omnidirectional image capturing unit may be additionally attached to a commonly used digital camera, smartphone, or the like, so that the device has substantially the same functionality as the image capturing device 1.

As illustrated in FIG. 11, the image capturing device 1 includes an image capturing unit 101, an image processing unit 104, an image capturing control unit 105, a central processing unit (CPU) 111, a read only memory (ROM) 112, a static random access memory (SRAM) 113, a dynamic random access memory (DRAM) 114, an operating unit 115, a network I/F 116, a communication unit 117, and an antenna 117a.

Furthermore, the image capturing unit 101 includes wide-angle lenses (what are called fish-eye lenses) 102a and 102b that have an angle of view of equal to or greater than 180° so as to form a hemispheric image and includes the two image capturing elements 103a and 103b that are provided to correspond to the wide-angle lenses. The image capturing elements 103a and 103b include an image sensor, such as a complementary metal oxide semiconductor (CMOS) sensor or charge coupled device (CCD) sensor, that converts an optical image formed by the fish-eye lens into image data using an electric signal for output; a timing generation circuit that generates horizontal or vertical synchronization signals for the image sensor, pixel clocks, or the like; a group of registers in which various commands, parameters, or the like, necessary for operations of the image capturing element are set; and the like.

Each of the image capturing elements 103a and 103b of the image capturing unit 101 is connected to the image processing unit 104 via a parallel I/F bus. Furthermore, the image capturing elements 103a and 103b of the image capturing unit 101 are connected to the image capturing control unit 105 via a serial I/F bus (an I2C bus, or the like). The image processing unit 104 and the image capturing control unit 105 are connected to the CPU 111 via a bus 110. Furthermore, the ROM 112, the SRAM 113, the DRAM 114, the operating unit 115, the network I/F 116, the communication unit 117, an electronic compass 118, and the like, are connected to the bus 110.

The image processing unit 104 acquires the image data that is output from the image capturing elements 103a and 103b via the parallel I/F bus, performs a predetermined operation on the image data, performs an operation to combine the image data so as to generate data on the Mercator image illustrated in FIG. 4(c).

Generally, the image capturing control unit 105 uses the image capturing control unit 105 as a master device and the image capturing elements 103a and 103b as slave devices and uses the I2C bus to set commands, or the like, in the group of registers in the image capturing elements 103a and 103b. Necessary commands, and the like, are received from the CPU 111. Furthermore, the image capturing control unit 105 also uses the I2C bus to acquire status data, and the like, from the group of registers in the image capturing elements 103a and 103b and feeds it to the CPU 111.

Moreover, the image capturing control unit 105 instructs the image capturing elements 103a and 103b to output image data when the shutter button of the operating unit 115 is pressed. In some cases, the image capturing device has a preview function or a function that supports a movie display by using a display. In this case, image data is continuously output from the image capturing elements 103a and 103b at a predetermined frame rate (frame/minute).

Furthermore, as described below, the image capturing control unit 105 also functions as a synchronization control unit that synchronizes the image data output timings of the image capturing elements 103a and 103b in cooperation with the CPU 111. In the present embodiment, a display unit is not provided in the image capturing device; however, a display unit may be provided.

The CPU 111 controls the overall operation of the image capturing device 1 and performs necessary operations. The ROM 112 stores various programs for the CPU 111. The SRAM 113 and the DRAM 114 are working memories that store a program executed by the CPU 111, data that is being processed, and the like. Especially, the DRAM 114 stores the image data that is being processed by the image processing unit 104 or the data on the processed Mercator image.

The operating unit 115 is a generic term for various operation buttons, the power switch, the shutter button, the touch panel that has both display and operation functions, and the like. Users operate an operation button so as to input various image capturing modes, image capturing conditions, and the like.

The network I/F 116 is a generic term for interface circuits (a USB I/F, and the like) for additionally installed media, such as an SD card, a personal computer, or the like. Furthermore, in some cases, it is possible that the network I/F 116 is a network interface regardless of whether it is wireless or wired. Data on a Mercator image stored in the DRAM 114 is recorded in an additionally installed medium via the network I/F 116 or, if needed, is transmitted to an external device, such as the communication terminal 3, via the network I/F 116 that is a network I/F.

The communication unit 117 communicates with an external device, such as the communication terminal 3, via the antenna 117a installed in the image capturing device 1 by using a short-range wireless technology, such as Wireless Fidelity (WiFi) or NFC. The communication unit 117 is also capable of transmitting Mercator image data to an external device, such as the communication terminal 3.

The electronic compass 118 calculates the orientation and the tilt (the roll angle) of the image capturing device 1 by using the earth magnetism and outputs the orientation/tilt information. The orientation/tilt information is an example of metadata in accordance with Exif and is used for image processing, such as image correction, on a captured image. The metadata includes various types of data, such as a thumbnail of image data, the image capturing time and date of an image, or the data volume of image data.

Next, an explanation is given, with reference to FIG. 12, of a hardware configuration of the communication terminal 3. FIG. 12 is a hardware configuration diagram in a case where the communication terminal is a smartphone.

As illustrated in FIG. 12, the communication terminal 3 includes a CPU 301 that controls the overall operation of the communication terminal 3; a ROM 302 that stores basic input/output programs; a random access memory (RAM) 303 that is used as a work area for the CPU 301; an electrically erasable and programmable ROM (EEPROM) 304 that performs reading or writing of data under the control of the CPU 301; a CMOS sensor 305 that is an image capturing element that captures an image of an object and acquires the image data under the control of the CPU 301; an electromagnetic compass or gyrocompass that detects the earth magnetism; various acceleration/orientation sensors 306, such as an acceleration sensor; and a medium drive 308 that controls reading or writing (storing) of data from or to a recording medium 307, such as a flash memory. The recording medium 307 is configured to be attached or removed, and the already recorded data is read from or new data is written and stored in the recording medium 307 under the control of the medium drive 308.

The EEPROM 304 stores the operating system (OS) executed by the CPU 301, other programs, and various types of data. Furthermore, a CCD sensor may be used instead of the CMOS sensor 305.

The communication terminal 3 further includes a sound input unit 311 that converts sound into a sound signal; a sound output unit 312 that converts a sound signal into sound; an antenna 313a; a communication unit 313 that communicates with the nearest base station 9a, or the like, by using a wireless communication signal by means of the antenna 313a; a Global Positioning System (GPS) receiving unit 314 that receives a GPS signal including the positional information (the latitude, longitude, and altitude) on the communication terminal 3 by using a GPS satellite or Indoor MEssaging System that is an indoor GPS; the display 315 that is a liquid crystal display, organic EL display, or the like, that displays the image of an object, various icons, and the like; a touch panel 316 that is mounted on the display 315 and is made up of a pressure-sensitive or static panel so as to detect the touch location on the display 315 that is touched by a finger, stylus, or the like; and a bus line 310, such as an address bus or data bus, that electrically connects the above-described units.

The sound input unit 311 includes a microphone that inputs sound, and the sound output unit 312 includes a speaker that outputs sound.

Next, an explanation is given, with reference to FIG. 13, of a hardware configuration of the predetermined-area management system 5 and the image management system 7. FIG. 13 is a hardware configuration diagram of the predetermined-area management system 5 and the image management system 7. The predetermined-area management system 5 and the image management system 7 are generally used server computers; therefore, a configuration of the predetermined-area management system 5 is explained below, and an explanation of a configuration of the image management system 7 is omitted.

The predetermined-area management system 5 includes a CPU 501 that controls the overall operation of the predetermined-area management system 5; a ROM 502 that stores programs, such as IPL, that are used for driving the CPU 501; a RAM 503 that is used as a work area for the CPU 501; an HD 504 that stores various types of data, such as programs for the predetermined-area management system 5; a hard disk drive (HDD) 505 that controls reading or writing of various types of data from or to the HD 504 under the control of the CPU 501; a medium drive 507 that controls reading or writing (storing) of data from or to a recording medium 506, such as a flash memory; a display 508 that displays various types of information, such as a cursor, menus, windows, characters, or images; a network I/F 509 that is used for data communication via the communication network 9, a keyboard 511 that includes a plurality of keys to input characters, numbers, various instructions, or the like; a mouse 512 that selects or executes various instructions, select an object to be processed, moves the cursor, or the like; a CD-ROM (compact disc read only memory) drive 514 that controls reading or writing of various types of data from or to a CD-ROM 513 that is an example of a removable recording medium; and a bus line 510, such as an address bus or data bus, that electrically connects the above-described components as illustrated in FIG. 13.

Functional Configuration According to the Embodiment

Figure 14:
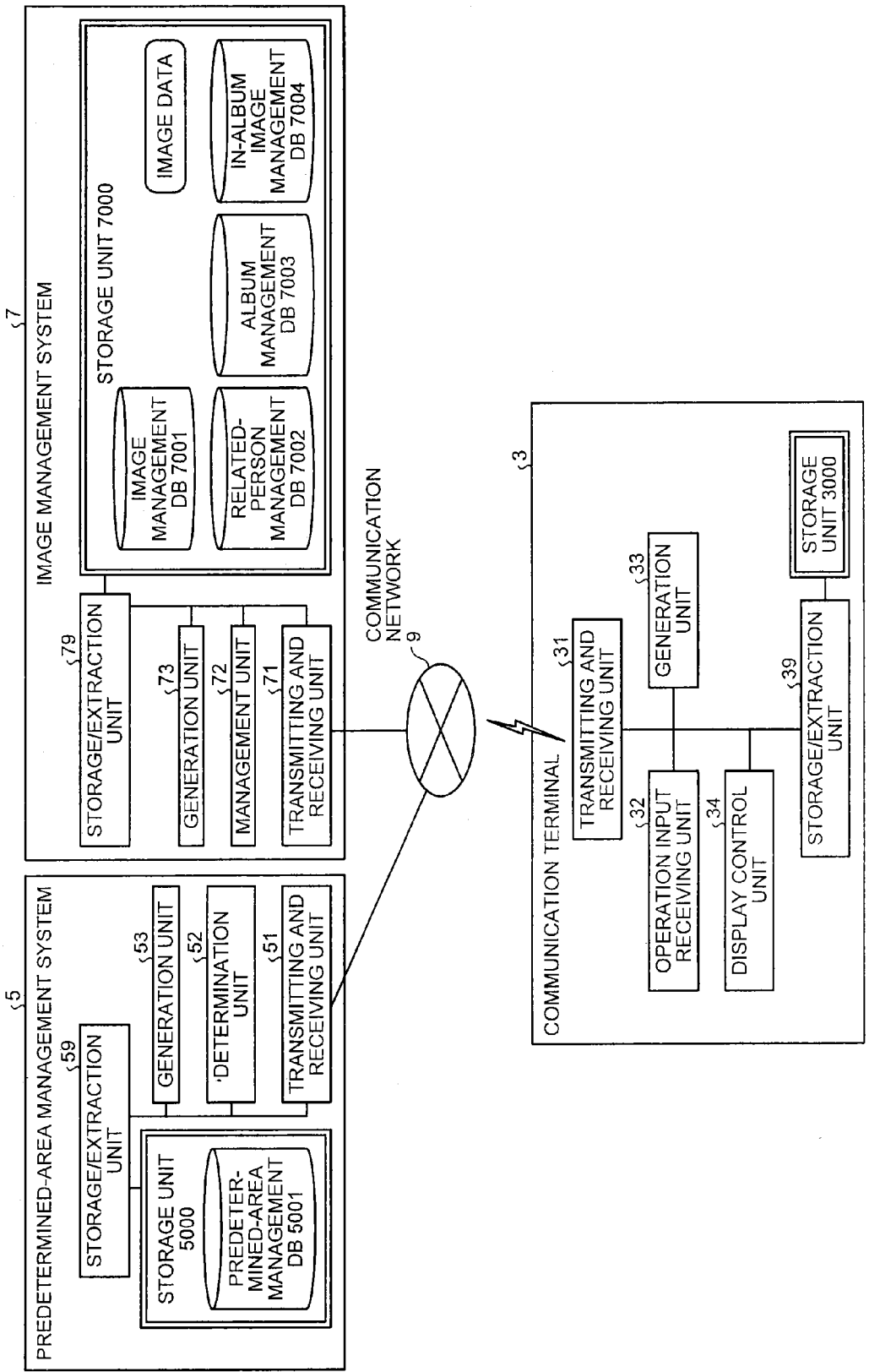
FIG. 14 is a functional block diagram of the communication terminal, the predetermined-area management system, and the image management system according to the embodiment.

Next, an explanation is given, with reference to FIG. 14, of a functional configuration according to the present embodiment. FIG. 14 is a functional block diagram of the communication terminal 3, the predetermined-area management system 5, and the image management system 7 that are included in the image sharing system according to the present embodiment. In FIG. 14, the communication terminal 3, the predetermined-area management system 5, and the image management system 7 can perform data communication via the communication network 9.

Functional Configuration of Communication Terminal

As illustrated in FIG. 14, the communication terminal 3 includes a transmitting and receiving unit 31, an operation input receiving unit 32, a generation unit 33, a display control unit 34, and a storage/extraction unit 39. Each of the units is a function or a unit that is implemented when any of the components illustrated in FIG. 11 is operated in accordance with a command received from the CPU 111 that follows the program for the communication terminal 3 that is loaded from the SRAM 113 into the DRAM 114.

Furthermore, the communication terminal 3 includes a storage unit 3000 that is configured by using the ROM 112, the SRAM 113, and the DRAM 114 that are illustrated in FIG. 11.

Each Functional Configuration of Communication Terminal

Next, a detailed explanation is further given, with reference to FIGS. 12 and 14, of each functional configuration of the communication terminal 3.

The transmitting and receiving unit 31 of the communication terminal 3 is principally implemented due to operations of the communication unit 313 and the CPU 301 that are illustrated in FIG. 12 so as to transmit and receives various types of data (or information) to and from the predetermined-area management system 5 or the image management system 7 via the communication network 9.

The operation input receiving unit 32 is principally implemented due to operations of the touch panel 316 and the CPU 301 so as to receive various selections or inputs from users.

The generation unit 33 is principally implemented due to an operation of the CPU 301 so as to generate a predetermined-area image from a fully-spherical panoramic image as illustrated in FIG. 9 in response to a user's designation or selection that is received by the operation input receiving unit 32. Furthermore, the generation unit 33 generates a thumbnail on the basis of the predetermined-area image as illustrated in FIGS. 10(a) and 10(b).

The display control unit 34 is principally implemented due to an operation of the CPU 301 so as to perform control to display various images, characters, or the like, on the display 315.

The storage/extraction unit 39 stores various types of data (or information) in the storage unit 3000 or extracts various types of data (or information) from the storage unit 3000. The storage/extraction unit 39 records or extracts various types of data, such as captured images, shared selection images, or predetermined-area images, in or from the storage unit 3000.

Functional Configuration of Predetermined-Area Management System

Next, a detailed explanation is given, with reference to FIG. 14, of each functional configuration of the predetermined-area management system 5. The predetermined-area management system 5 includes a transmitting and receiving unit 51, a determination unit 52, a generation unit 53, and a storage/extraction unit 59. Each of the units is a function or a unit that is implemented when any of the components illustrated in FIG. 13 is operated in accordance with a command received from the CPU 501 that follows the program for the predetermined-area management system 5 that is loaded from the HD 504 into the RAM 503.

Furthermore, the predetermined-area management system 5 includes a storage unit 5000 that is configured by using the RAM 503 and the HD 504 that are illustrated in FIG. 13. A predetermined-area management DB 5001 is established in the storage unit 5000 and is configured by using a predetermined-area management table, which will be described later.

Predetermined-Area Management Table

Figure 15:
FIG. 15 is a conceptual diagram that illustrates a predetermined-area management table.

FIG. 15 is a conceptual diagram that illustrates a predetermined-area management table. In the predetermined-area management table, user identification information for identifying a user, image identification information for identifying image data, and predetermined-area information are stored in association with one another for management. The predetermined-area information is information that indicates the x-coordinate (rH) and the y-coordinate (rV) of the location of the virtual camera IC in the fully-spherical panoramic image and the angle of view (angle) in order to determine the predetermined area T illustrated in FIG. 9(a). Moreover, as illustrated in FIG. 10(a), if a plurality of attention points is set on a single captured image, a plurality of pieces of predetermined-area information is associated with single image identification information in FIG. 15.

FIG. 15 illustrates a user ID (identification) as an example of the user identification information; however, it does not need to be a user ID as long as it can identify a user. For example, the user identification information includes an employee number, student ID number, citizen number based on a national identity numbering system, or the like. Moreover, FIG. 15 illustrates an image ID as an example of the image identification information; however, it does not need to be an image ID as long as it can identify image data. For example, the image identification information includes a file name of image data, or the like.

Each Functional Configuration of Predetermined-Area Management System

Next, a detailed explanation is given, with reference to FIGS. 13 and 14, of each functional configuration of the predetermined-area management system 5.

The transmitting and receiving unit 51 of the predetermined-area management system 5 is principally implemented due to operations of the network I/F 509 and the CPU 501 that are illustrated in FIG. 13 so as to transmit and receive various types of data (or information) to and from the communication terminal 3 or the image management system 7 via the communication network 9.

The determination unit 52 is principally implemented by the CPU 501 that is illustrated in FIG. 13 so as to determine whether the predetermined-area management DB 5001 stores the combination of image identification information and predetermined-area information that matches the combination received by the transmitting and receiving unit 51.

The generation unit 53 is principally implemented by the CPU 501 that is illustrated in FIG. 13 so as to generate a predetermined-area object, which will be explained later.

The storage/extraction unit 59 stores various types of data (or information) in the storage unit 5000 or extracts various types of data (or information) from the storage unit 5000.

Functional Configuration of Image Management System

Next, a detailed explanation is given, with reference to FIGS. 13 and 14, of a functional configuration of the image management system 7. The image management system 7 includes a transmitting and receiving unit 71, a generation unit 73, and a storage/extraction unit 79. Each of the units is a function or a unit that is implemented when any of the components illustrated in FIG. 13 is operated in accordance with a command received from the CPU 501 that follows the program for the image management system 7 that is loaded from the HD 504 into the RAM 503.

Furthermore, the image management system 7 includes a storage unit 7000 that is configured by using the RAM 503 and the HD 504 that are illustrated in FIG. 13. An image management DB 7001, a related-person management DB 7002, an album management DB 7003, and an in-album image management DB 7004 are established in the storage unit 7000. The image management DB 7001 is made up of an image management table, which will be described later. The related-person management DB 7002 is made up of a related-person management table. The album management DB 7003 is made up of an album management table. The in-album image management DB 7004 is made up of an in-album image management table.

Image Management Table

FIG. 16 is a conceptual diagram that illustrates the image management table. User identification information for identifying a user; user name; image identification information for identifying an image; Uniform Resource Locator (URL) information indicating an URL that is a storage location, in the storage unit 7000, of image data that is associated with the image identification information; attribute information; comment ID for identifying a user's comment; contents of the comment (text data); and the posting time and date of the comment are associated with one another in the image management table for management.

The user identification information and the image identification information illustrated in FIG. 16 are conceptually the same as the user identification information and the image identification information illustrated in FIG. 15.

Related-Person Management Table

FIG. 17 is a conceptual diagram that illustrates a related-person management table. In the related-person management table, user identification information for identifying users who belong to each group, e.g., a group of friends, is associated with one another for management. An example of the related person includes a friend, family, employee of the same company, or the like. The user identification information illustrated in FIG. 17 is conceptually the same as the user identification information illustrated in FIG. 15.

Album Management Table

FIG. 18 is a conceptual diagram that illustrates an album management table. In the album management table, a user name and album identification information are associated with user identification information for management. The user identification information illustrated in FIG. 18 is conceptually the same as the user identification information illustrated in FIG. 15. FIG. 19 illustrates an album ID as an example of the album identification information.

IN-Album Image Management Table

FIG. 19 is a conceptual diagram that illustrates the in-album image management table. In the in-album image management table, an album name and image identification information on image data included in the album are associated with album identification information for management. The album identification information illustrated in FIG. 19 is conceptually the same as the album identification information illustrated in FIG. 18. Furthermore, the image identification information illustrated in FIG. 19 is conceptually the same as the image identification information illustrated in FIG. 15.

Each Functional Configuration of Image Management System

Next, a detailed explanation is given, with reference to FIG. 14, of each functional configuration of the image management system 7.

The transmitting and receiving unit 71 of the image management system 7 is principally implemented due to operations of the network I/F 509 and the CPU 501 that are illustrated in FIG. 13 so as to transmit and receive various types of data (or information) to and from the communication terminal 3 or the predetermined-area management system 5 via the communication network 9.

In order for the image management system 7 to manage the image data transmitted from the communication terminal 3, a management unit 72 assigns image identification information to the image data and attaches the image identification information to the header section of the image data.

The generation unit 73 generates an image object, a related-person list object, an album object, and an in-album image object. Each of the objects will be explained later.

The storage/extraction unit 79 stores various types of data (or information), such as image data, in the storage unit 7000 or extracts various types of data (or information), such as image data, from the storage unit 7000.

Process or Operation According to the Embodiment

Figure 20:
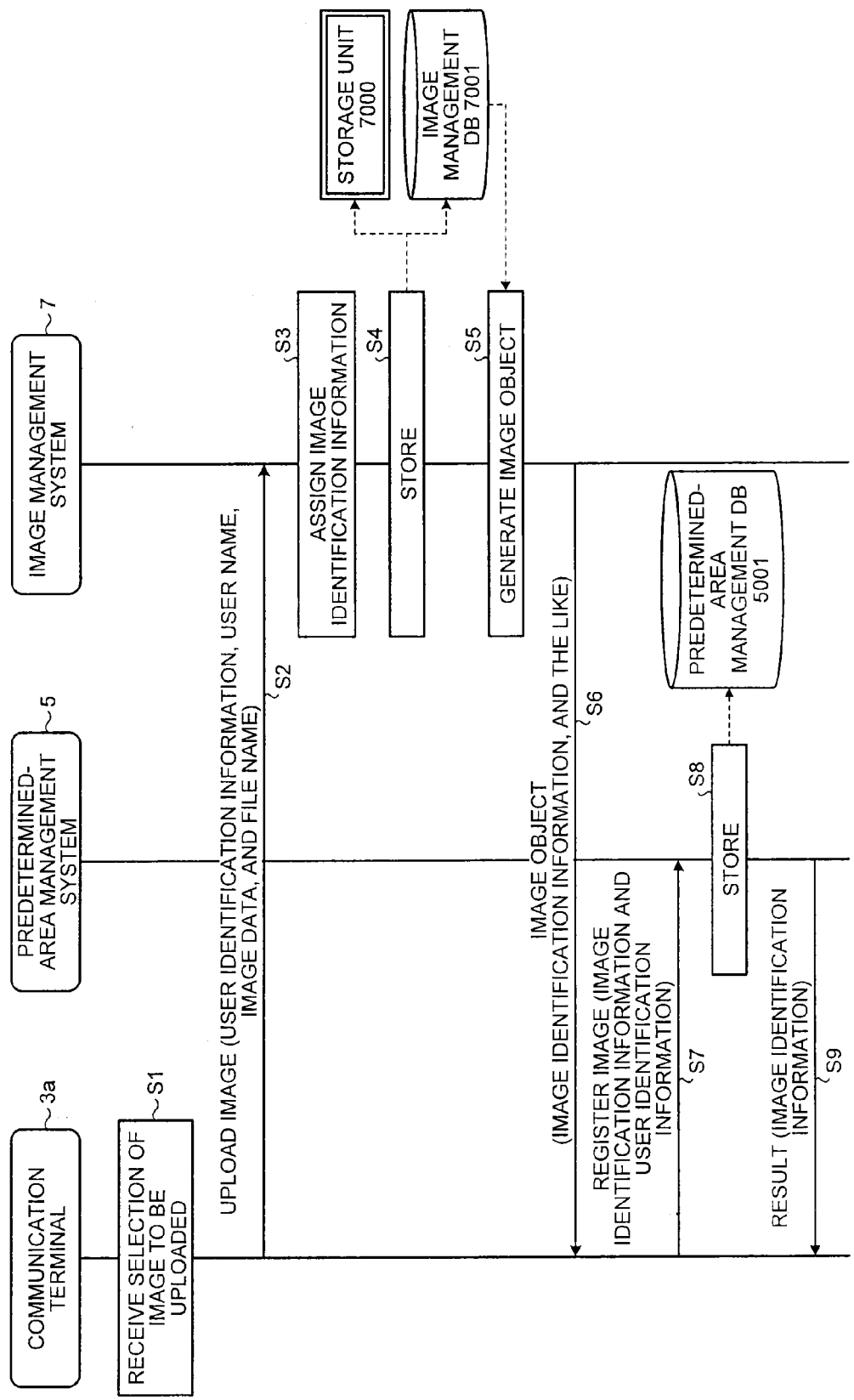
FIG. 20 is a sequence diagram that illustrates a process to upload a captured image.
Figures 21, 22:
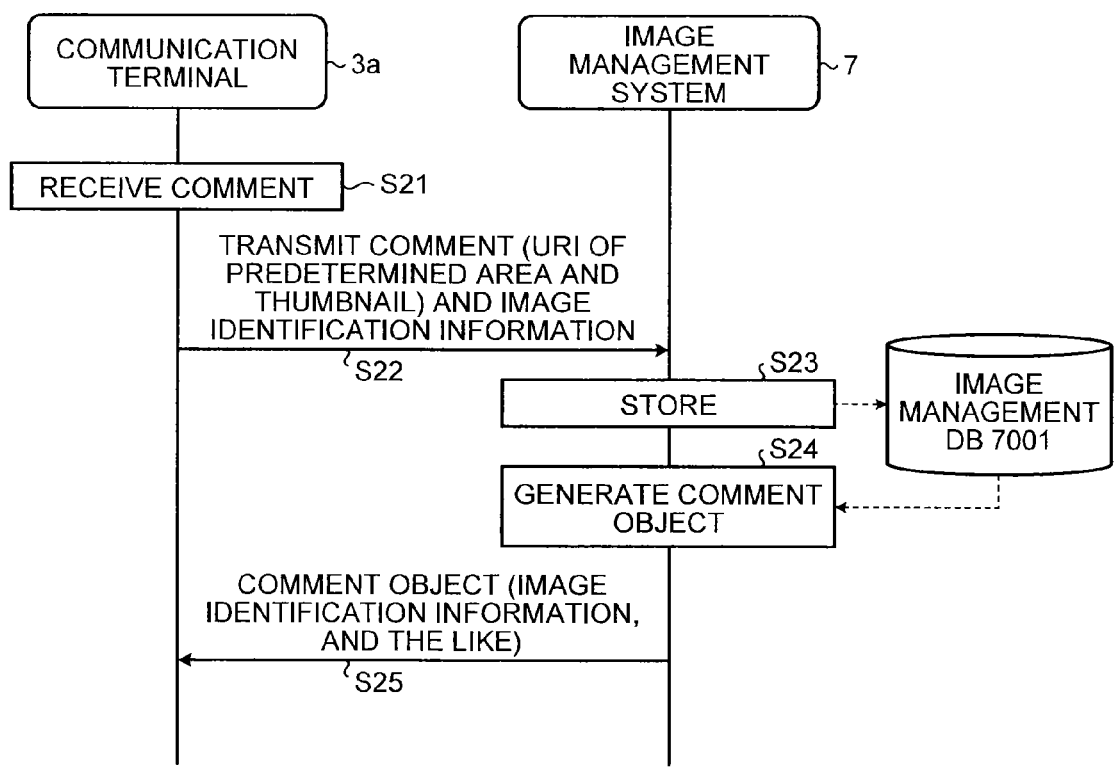
FIG. 21 is a diagram that illustrates an image object.
FIG. 22 is a sequence diagram that illustrates a process to post a predetermined area as a comment in the image management system.

Next, an explanation is given, with reference to FIGS. 20 and 21, of a process performed when the user A uses the communication terminal 3a to upload image data. FIG. 20 is a sequence diagram that illustrates a process to upload a captured image. FIG. 21 is a diagram that illustrates an image object.

A communication performed among the communication terminal 3, the predetermined-area management system 5, and the image management system 7 via the communication network 9 is a HyperText Transfer Protocol (HTTP) communication using an HTTP protocol. The communication terminal 3a corresponds to an HTTP client, and the predetermined-area management system 5 and the image management system 7 correspond to HTTP servers.

In the following, if not otherwise specified, the arrow from the communication terminal 3a to the predetermined-area management system 5 and the image management system 7 in the sequence diagram corresponds to an HTTP request, and the arrow from the predetermined-area management system 5 and the image management system 7 to the communication terminal 3a corresponds to an HTTP response.

First, the user A imports the image data from the image capturing device 1 to the storage unit 3000 of the communication terminal 3a.

Next, the user A selects the image data that is to be uploaded, and the operation input receiving unit 32 of the communication terminal 3a receives a selection of the image data to be uploaded (Step S1). The transmitting and receiving unit 31 of the communication terminal 3a then transmits, to the image management system 7 via the communication network 9, data, i.e., the user identification information on the user A, the user name of the user A, the image data including the attribute information, and the file name of the image data, thereby uploading the image data (Step S2). Thus, the transmitting and receiving unit 71 of the image management system 7 receives the data, i.e., the user identification information, the user name, the image data, and the file name.

Next, in order for the image management system 7 to manage the image data transmitted from the communication terminal 3a, the management unit 72 of the image management system 7 assigns image identification information to the image data and attaches the image identification information to the header section of the image data (Step S3).

The storage/extraction unit 79 then stores various data (excluding the image data) received at Step S2 and the image identification information assigned at Step S3 in the image management table (see FIG. 16) for management and also stores the image data in the storage unit 7000 for management (Step S4).

The generation unit 73 then generates an image object illustrated in FIG. 21 on the basis of the image management table that is managed at Step S4 (Step S5). The image object includes image identification information, file name, URL information, and the attribute information included in the image data. The URL information indicates the location where the image data is stored in the storage unit 7000. The transmitting and receiving unit 71 then transmits the data on the image object to the communication terminal 3a via the communication network 9 (Step S6). Thus, the transmitting and receiving unit 31 of the communication terminal 3a receives the data on the image object.

The transmitting and receiving unit 31 of the communication terminal 3a transmits, to the predetermined-area management system 5 via the communication network 9, the user identification information and the image identification information in the image object received at the above-described Step S6 (Step S7). Thus, the transmitting and receiving unit 51 of the predetermined-area management system 5 receives the user identification information and the image identification information.

The storage/extraction unit 59 of the predetermined-area management system 5 then associates the user identification information and the image identification information, which are received at the above-described Step S7, with each other and newly stores them in the predetermined-area management table for management (see FIG. 15) (Step S8). The transmitting and receiving unit 51 then transmits, to the communication terminal 3a via the communication network 9, the image identification information as well as the result that indicates that the management of the user identification information and the image identification information has been completed (Step S9). Thus, the sequence of operations to upload the image data is terminated.

Next, an explanation is given, with reference to FIGS. 22 and 23, of a process to post a predetermined area (including an attention point) as a comment with respect to the image data uploaded into the image management system 7 by the user A. FIG. 22 is a sequence diagram that illustrates a process to post a predetermined area as a comment in the image management system. FIG. 23 is a diagram that illustrates the details of a comment object.

The user A first accesses the image management system 7 by using the communication terminal 3a, acquires and views the image data managed at the above-described Step S5, and then performs an operation to post a comment with respect to the image data, and then the operation input receiving unit 32 of the communication terminal 3a receives the posted comment (Step S21). In this case, the user A inputs, as a comment, the URI of the predetermined-area image (the partial image P1) that includes the attention point AP1 illustrated in FIG. 10(a) and inputs the thumbnail of the predetermined-area image.

The transmitting and receiving unit 31 of the communication terminal 3a then transmits, to the image management system 7 via the communication network 9, the comment received at the above-described Step S21 and the image identification information on the image data to which the comment is attached (Step S22). Thus, the transmitting and receiving unit 71 of the image management system 7 receives the comment and the image identification information.

By using the comment and the image identification information received at the above-described Step S22, the storage/extraction unit 79 of the image management system 7 then stores, for management, the comment ID, the contents of the comment, and the posting time and date of the comment in the record section for the image identification information managed in the image management table (see FIG. 16) (Step S23). The comment ID is an ID that is assigned by the image management system 7 when the contents of the comment are managed at Step S23.

The generation unit 73 then generates a comment object illustrated in FIG. 23 on the basis of various types of information managed at Step S23 (Step S24). The data on the comment object includes the URI of the predetermined area, the comment ID in the image management system 7, the user name and user identification information of the user A, the character string of the posted comment, and the time and date that the comment is posted (generated). Thus, the comment is posted.

The transmitting and receiving unit 71 then transmits the data on the comment object to the communication terminal 3a via the communication network 9 (Step S25). Thus, the transmitting and receiving unit 31 of the communication terminal 3a receives the data on the comment object.

Figure 24:
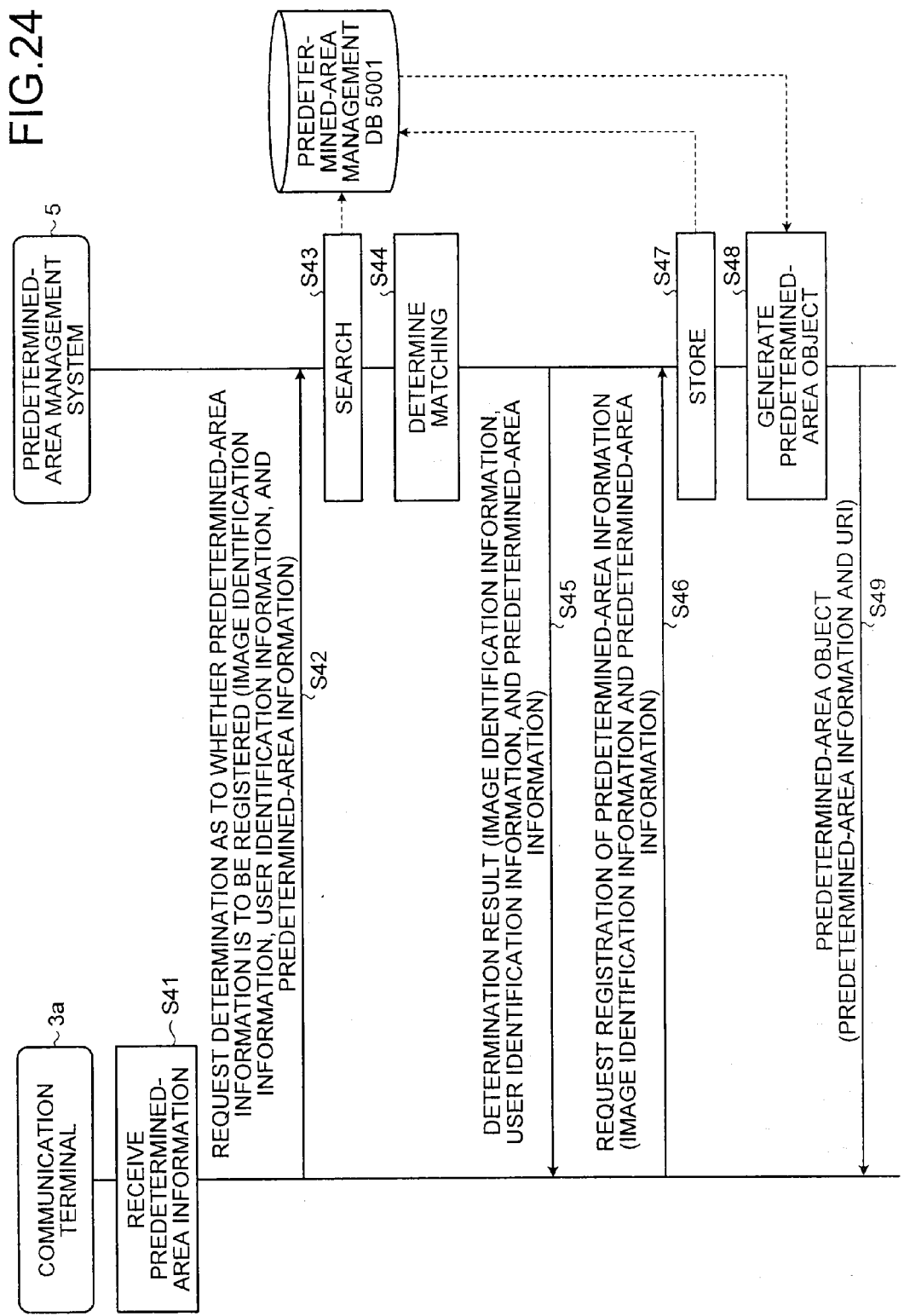
FIG. 24 is a sequence diagram that illustrates a process to register a predetermined area in the predetermined-area management system.
Figure 25:
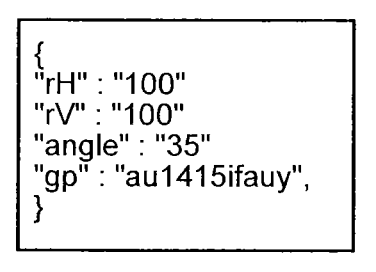
Figure 34:
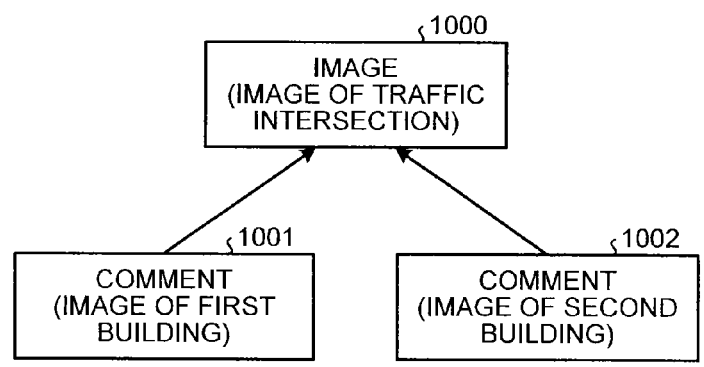
FIG. 34 is a diagram that illustrates the posted image and the comments.

Here, in this situation, the comment is associated with the image 1000 only unidirectionally as described above and illustrated in FIG. 34. Next, an explanation is given, with reference to FIGS. 24 and 25, of a process to associate the comment 1001 with the image 1000 bidirectionally. FIG. 24 is a sequence diagram that illustrates a process to register a predetermined area in the predetermined-area management system 5. FIG. 25 is a diagram that illustrates the details of a predetermined-area object.

First, the user A selects predetermined-area information to be registered in the predetermined-area management system 5, and then the operation input receiving unit 32 of the communication terminal 3a receives a selection of the predetermined-area information to be registered (Step S41). The transmitting and receiving unit 31 of the communication terminal 3a then transmits, to the predetermined-area management system 5 via the communication network 9, the image identification information received at the above-described Step S25, the user identification information on the user A, and the predetermined-area information so as to request a determination as to whether the predetermined-area information is to be registered (Step S42). Thus, the transmitting and receiving unit 51 of the predetermined-area management system 5 receives the image identification information, the user identification information, and the predetermined-area information.

The determination unit 52 of the predetermined-area management system 5 searches the predetermined-area management table (see FIG. 15) by using the image identification information and the predetermined-area information, which are received at the above-described Step S42, as a search key (Step S43). The determination unit 52 then determines whether the predetermined-area management table stores the combination of the image identification information and the predetermined-area information that matches the combination of those received at the above-described Step S42 (Step S44). The transmitting and receiving unit 51 then transmits the determination result of the above-described Step S44 to the communication terminal 3a via the communication network 9 (Step S45). Thus, the transmitting and receiving unit 31 of the communication terminal 3a receives the determination result. The determination result includes three pieces of information (the image identification information, the user identification information, and the predetermined-area information) that are transmitted to the predetermined-area management system 5 at the above-described Step S42.

If the determination result indicates "a mismatch", the identical predetermined-area information has not been registered yet; therefore, the transmitting and receiving unit 31 of the communication terminal 3a transmits the image identification information and the predetermined-area information, which are received at the above-described Step S45, to the predetermined-area management system 5 via the communication network 9 so as to request a registration of the predetermined-area information (Step S46). Thus, the transmitting and receiving unit 51 of the predetermined-area management system 5 receives the image identification information and the predetermined-area information. If the determination result indicates "a match", the identical predetermined-area information has been already registered; therefore, the process during Steps S46 to 49 is not performed.

On the basis of the image identification information and the predetermined-area information that are received at the above-described Step S46, the storage/extraction unit 59 of the predetermined-area management system 5 then stores and registers the predetermined-area information in the record section for the image identification information that is managed together with the user identification information in the predetermined-area management table (see FIG. 15) (Step S47).

Next, the generation unit 53 generates a predetermined-area object illustrated in FIG. 25 on the basis of the information in the predetermined-area management table (see FIG. 15) (Step S48). The data on the predetermined-area object includes the predetermined-area information (the x-coordinate, the y-coordinate, and the angle of view α) and the image identification information.

The transmitting and receiving unit 51 then transmits the data on the predetermined-area object to the communication terminal 3a via the communication network 9 (Step S49). Thus, the transmitting and receiving unit 31 of the communication terminal 3a receives the data on the predetermined-area object.

Figure 26:
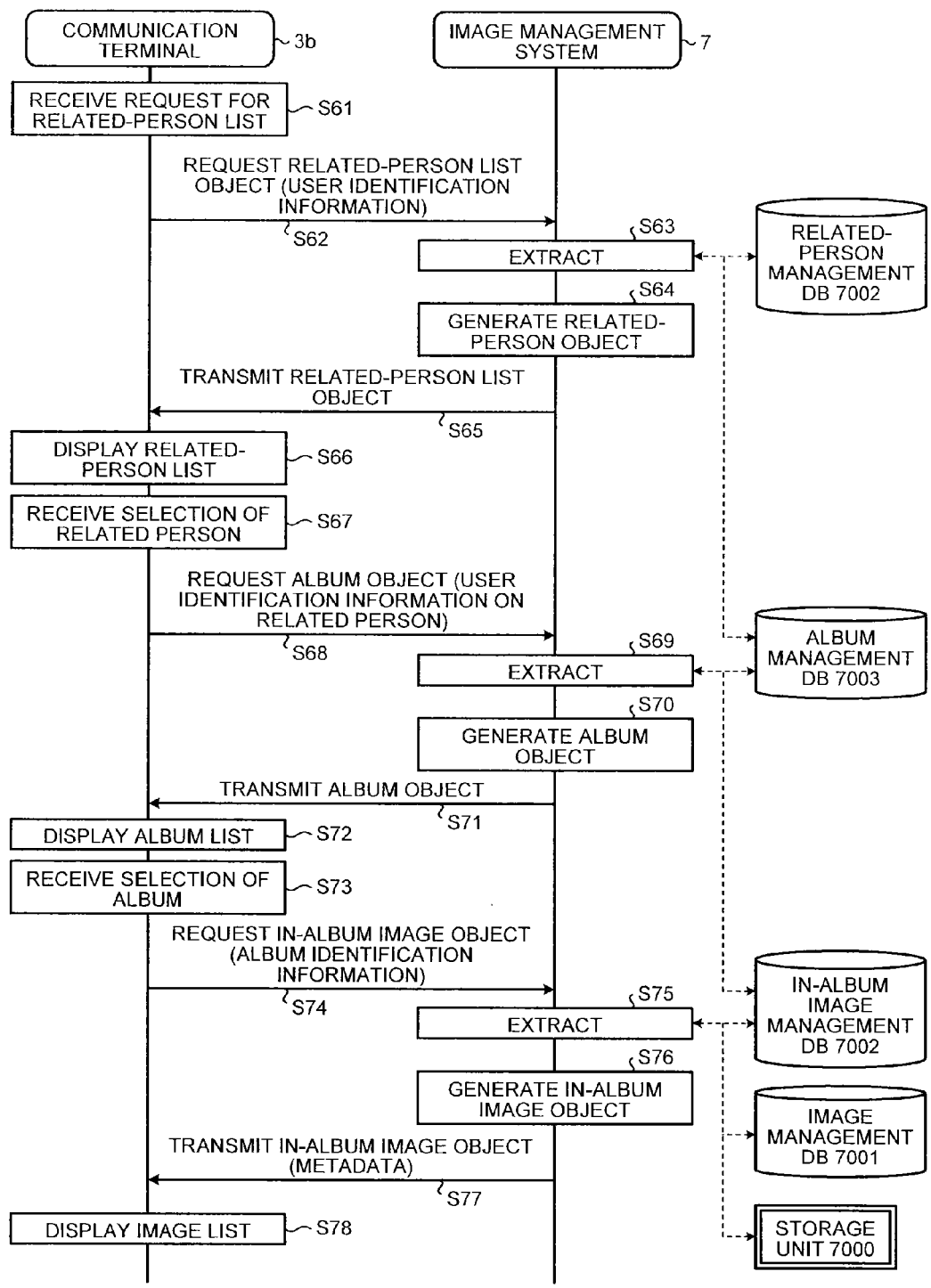
FIG. 26 is a sequence diagram that illustrates a process performed from when a related-person list is requested till when an image list is displayed.
Figure 27:
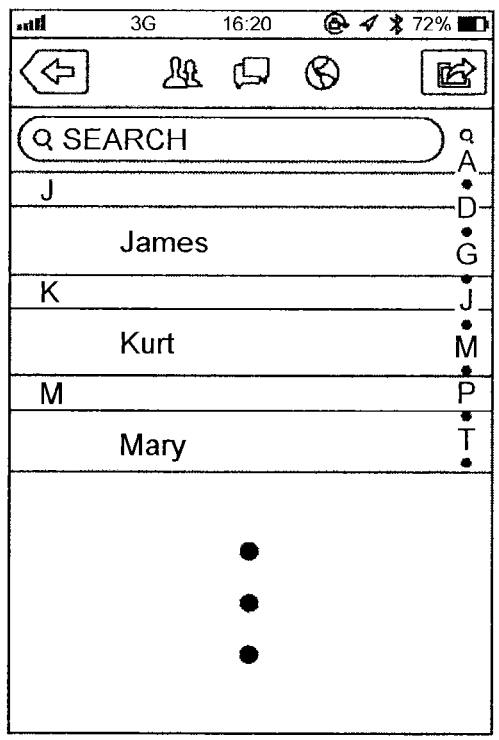
FIG. 27 is a diagram that illustrates a related-person list that is presented on the display.
Figure 28:
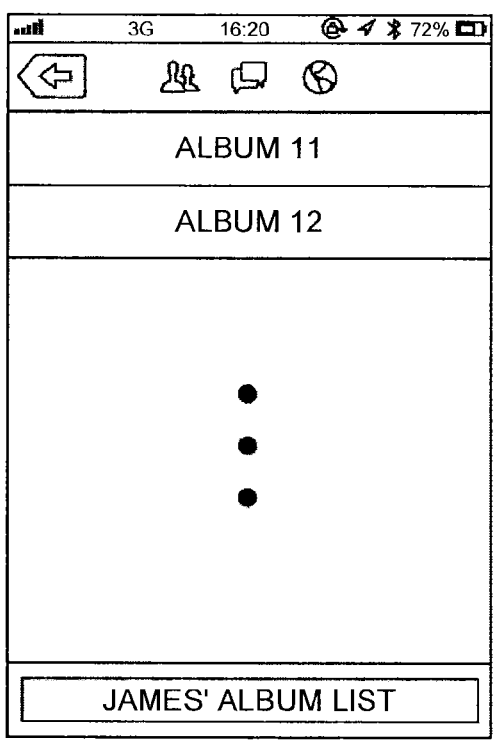
FIG. 28 is a diagram that illustrates an album list that is presented on the display.
Figure 29:
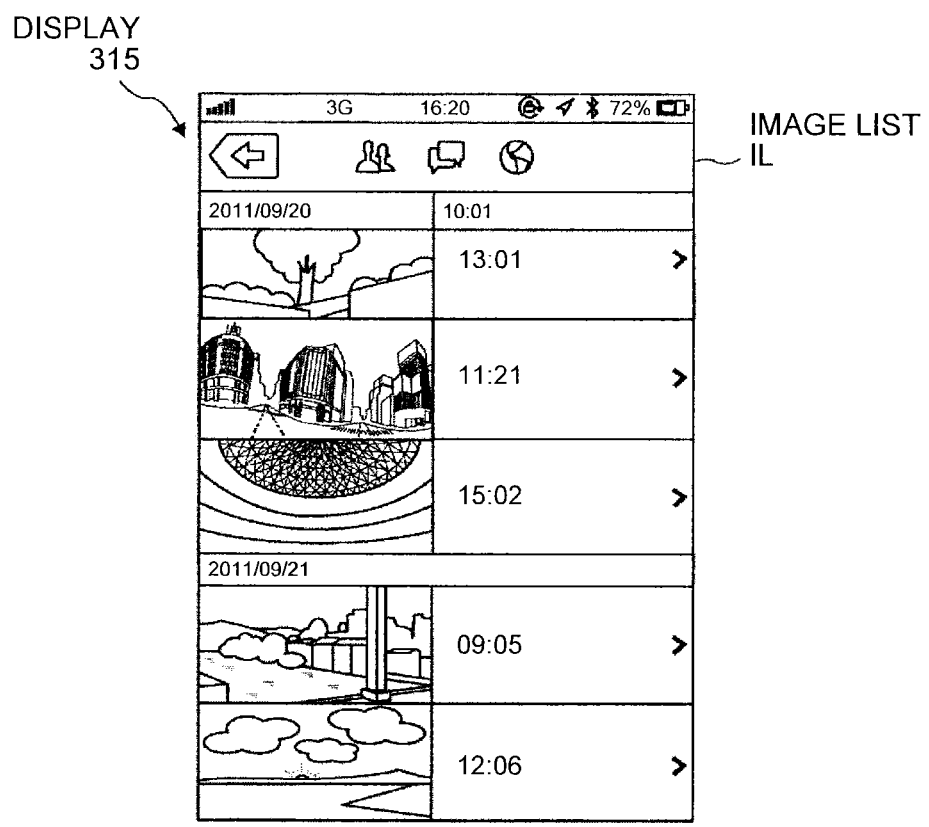
FIG. 29 is a diagram that illustrates an image list that is presented on the display.
Figure 33:
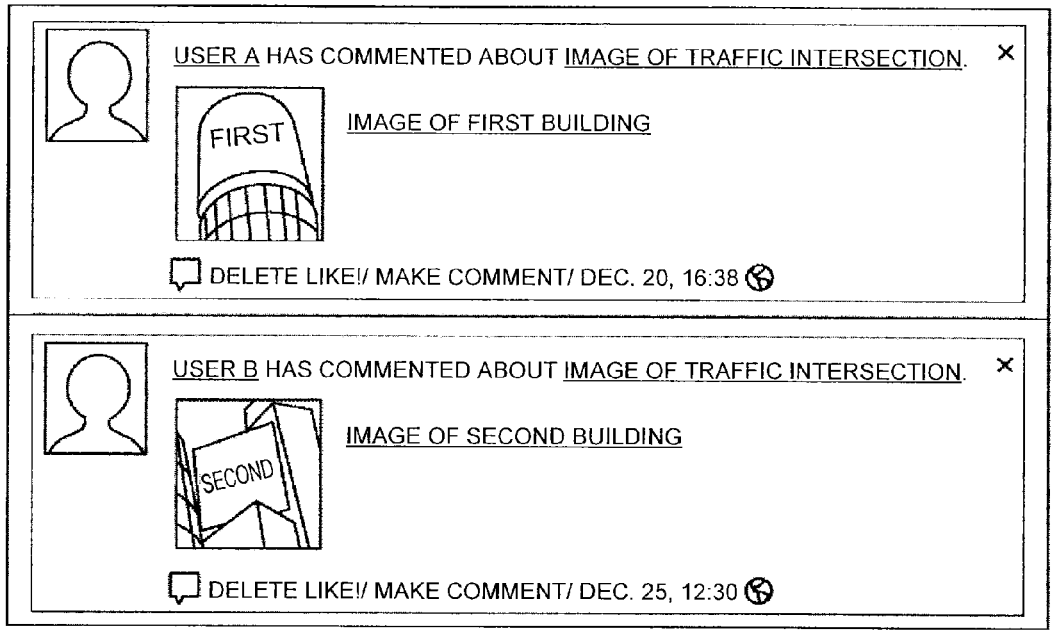
FIG. 33 is a diagram that illustrates the posted comments.

Next, an explanation is given, with reference to FIGS. 26 to 29, of a process performed from when the user B requests a related-person list by using the communication terminal 3b till when an image list is displayed. FIG. 26 is a sequence diagram that illustrates a process performed from when a related-person list is requested till when an image list is displayed. FIG. 27 is a diagram that illustrates a related-person list that is presented on the display. FIG. 28 is a diagram that illustrates an album list that is presented on the display. FIG. 29 is a diagram that illustrates an image list that is presented on the display.

First, the user B uses the communication terminal 3b to perform an operation to request a related-person list of the user B, and then the operation input receiving unit 32 of the communication terminal 3b receives the request for the related-person list (Step S61). The transmitting and receiving unit 31 of the communication terminal 3b then transmits the user identification information on the user B to the image management system 7 via the communication network 9 so as to request a related-person list object of the user B (Step S62). Thus, the transmitting and receiving unit 71 of the image management system 7 receives the user identification information.

The storage/extraction unit 79 of the image management system 7 then searches the related-person management table (see FIG. 17) by using the user identification information on the user B, which is received at the above-described Step S62, as a search key so as to extract all the pieces of the user identification information from the record in which the user identification information on the user B is included and further searches the album management table (see FIG. 18) by using each of the extracted pieces of the user identification information as a search key so as to extract data on the related user name (Step S63). The generation unit 73 then generates an undepicted related-person object on the basis of all the pieces of the user identification information and the user names that are extracted at the above-described Step S63 (Step S64).

The transmitting and receiving unit 71 then transmits the data on the related-person object to the communication terminal 3b via the communication network 9 (Step S65). Thus, the transmitting and receiving unit 31 of the communication terminal 3b receives the data on the related-person object.

The display control unit 34 of the communication terminal 3b then presents the related-person list illustrated in FIG. 27 on the display 315 in accordance with the related-person object so as to prompt the user B to select a related person (Step S66).

Next, the user B selects the user A (here, "James") by using the communication terminal 3b, and then the operation input receiving unit 32 of the communication terminal 3b receives a selection of the related person (Step S67). The transmitting and receiving unit 31 of the communication terminal 3b then transmits the user identification information on the user A to the image management system 7 via the communication network 9 so as to request an album object of the user A (Step S68). Thus, the transmitting and receiving unit 71 of the image management system 7 receives the user identification information.

The storage/extraction unit 79 of the image management system 7 then searches the album management table (see FIG. 18) by using the user identification information on the user A, which is received at the above-described Step S68, as a search key so as to extract all the pieces of the album identification information from the record in which the user identification information on the user A is included and further searches the album image management table (see FIG. 19) by using each of the extracted pieces of the album identification information as a search key so as to extract data on the associated album name (Step S69). The generation unit 73 then generates an undepicted album object on the basis of all the pieces of the album identification information and the album names that are extracted at the above-described Step S69 (Step S70).

The transmitting and receiving unit 71 then transmits the data on the album object to the communication terminal 3b via the communication network 9 (Step S71). Thus, the transmitting and receiving unit 31 of the communication terminal 3b receives the data on the album object.

The display control unit 34 of the communication terminal 3b then presents the album list illustrated in FIG. 28 on the display 315 in accordance with the album object so as to prompt the user B to select an album (Step S72).

Next, the user B selects the album name (here, "album 11") by using the communication terminal 3b, and then the operation input receiving unit 32 of the communication terminal 3b receives a selection of the album (Step S73). The transmitting and receiving unit 31 of the communication terminal 3b then transmits the album identification information on the album 11 to the image management system 7 via the communication network 9 so as to request an in-album image object (Step S74). Thus, the transmitting and receiving unit 71 of the image management system 7 receives the album identification information.

The storage/extraction unit 79 of the image management system 7 then searches the in-album image management table (see FIG. 19) by using the album identification information, which is received at the above-described Step S74, as a search key so as to extract all the pieces of the image identification information from the record in which the album identification information on the album 11 is included, searches the image management table (see FIG. 16) by using the extracted image identification information as a search key so as to extract the associated URL information, and further extracts the metadata of the image data managed in the storage unit 7000 by using the extracted URL information (Step S75). The generation unit 73 then generates an undepicted in-album image object on the basis of the metadata of the image data that is extracted at the above-described Step S75 (Step S76). As described above, the metadata includes the thumbnail of the image data and the image capturing time and date of the image.

The transmitting and receiving unit 71 then transmits the data on the in-album image object to the communication terminal 3b via the communication network 9 (Step S77).

Thus, the transmitting and receiving unit 31 of the communication terminal 3b receives the data on the in-album image object.

The display control unit 34 of the communication terminal 3b then presents the image list illustrated in FIG. 29 on the display 315 in accordance with the in-album image object so as to prompt the user B to select image data from the album 11 (Step S78). An image list IL illustrated in FIG. 29 represents the thumbnail of each image data, the image capturing date, and the image capturing time.

Next, an explanation is given, with reference to FIGS. 30 to 32, of a process performed from when the user B uses the communication terminal 3b to acquire the image data till when the image data, the attention point, the predetermined area including the attention point, and the thumbnail are presented on the display 315, as illustrated in FIGS. 10(a) and 10(b). FIG. 30 is a sequence diagram that illustrates a process performed from when the image data is acquired by the communication terminal 3b till when the image data, the attention point, the predetermined area including the attention point, and the thumbnail are presented on the display 315. FIG. 31 is a diagram that illustrates the details of an image object. FIG. 32 is a diagram that illustrates the details of a predetermined-area list object.

First, the user B selects a desired thumbnail from the thumbnails illustrated in FIG. 29 so as to perform an operation to request image data, and then the operation input receiving unit 32 of the communication terminal 3b receives the request for the desired image data (Step S81). The transmitting and receiving unit 31 of the communication terminal 3b then transmits the image identification information on the desired image data to the image management system 7 via the communication network 9 so as to request an image object (Step S82). Thus, the transmitting and receiving unit 71 of the image management system 7 receives the image identification information.

The storage/extraction unit 79 of the image management system 7 then searches the image management table (see FIG. 16) by using the image identification information, which is received at the above-described Step S82, as a search key so as to extract the image identification information, the file name, the URL information, the attribute information included in the image data, the comment ID in the image management system 7, the user name of the user A, the user identification information, the contents of the posted comment, and the time and date that the comment is posted (generated) (Step S83). The generation unit 73 then generates an image object that includes a comment object illustrated in FIG. 31 on the basis of various types of information extracted at the above-described Step S83 (Step S84). The image object is the data obtained by combining the image object illustrated in FIG. 21 and the comment object illustrated in FIG. 23.

The transmitting and receiving unit 71 then transmits the data on the image object to the communication terminal 3b via the communication network 9 (Step S85). Thus, the transmitting and receiving unit 31 of the communication terminal 3b receives the data on the image object.

Next, the transmitting and receiving unit 31 of the communication terminal 3b transmits the URL information, which is acquired at the above-described Step S85, to the image management system 7 via the communication network 9 so as to request image data (Step S86). Thus, the transmitting and receiving unit 71 of the image management system 7 receives the URL information.

The storage/extraction unit 79 of the image management system 7 searches the storage unit 7000 by using the URL information, which is received at the above-described Step S86, as a search key so as to extract the associated image data (Step S87). The transmitting and receiving unit 71 then transmits the image data to the communication terminal 3b via the communication network 9 (Step S88). Thus, the transmitting and receiving unit 31 of the communication terminal 3b receives the image data.

Next, the transmitting and receiving unit 31 of the communication terminal 3b transmits, to the predetermined-area management system 5 via the communication network 9, the same image identification information as the image identification information transmitted at the above-described Step S82 so as to request a predetermined-area list (Step S89). Thus, the transmitting and receiving unit 51 of the predetermined-area management system 5 receives the image identification information.

The storage/extraction unit 59 of the predetermined-area management system 5 then searches the predetermined-area management table (see FIG. 15) by using the image identification information, which is received at the above-described Step S89, as a search key so as to extract the associated predetermined-area information (Step S90). The generation unit 53 then generates a predetermined-area list object illustrated in FIG. 32 on the basis of the predetermined-area information that is extracted at the above-described Step S90 (Step S91). In the predetermined-area list object, a captured image is associated with a predetermined area that includes an attention point that is set with respect to the captured image. Furthermore, if a plurality of attention points is set, a single captured image is associated with a plurality of predetermined areas that each includes the corresponding one of the attention points.

Next, the transmitting and receiving unit 51 transmits the data on the predetermined-area list object to the communication terminal 3b via the communication network 9 (Step S92). Thus, the transmitting and receiving unit 31 of the communication terminal 3b receives the data on the predetermined-area list object.

The display control unit 34 of the communication terminal 3b then presents a predetermined-area image (the partial image P) on the display 315 as illustrated in FIG. 9(b) on the basis of the image data received at the above-described Step S88 (Step S93).

Next, the generation unit 33 generates a thumbnail of each predetermined-area image on the basis of the image data received at the above-described Step S88 and the predetermined-area list object received at the above-described Step S92 (Step S94). The display control unit 34 then displays the thumbnail generated at Step S94 as the thumbnail T1, or the like, illustrated in FIG. 10(a) (Step S95).

Finally, the display control unit 34 displays the attention point AP1, and the like, illustrated in FIG. 10(a).

Principal Advantages of the Present Embodiment

As described above, according to the present embodiment, the predetermined-area management system 5 stores the image identification information and the predetermined-area information in association with each other (see FIG. 15) and transmits, to the communication terminal, the predetermined-area information that is associated with the image identification information received from the communication terminal 3 (see Step S92 in FIG. 30), whereby the communication terminal 3 is capable of displaying the image data and the predetermined-area image in an associated manner (see FIG. 10(a)).

Additional Notes of the Embodiment

The predetermined-area management system 5 and the image management system 7 according to the above-described embodiment may be configured by using a single computer or may be configured by using a plurality of computers to which each unit (function, unit, or storage unit) is divided and assigned arbitrarily.

Furthermore, a recording medium, such as a CD-ROM, that stores each program according to the above-described embodiment or the HD 504 that stores the program may be provided as a program product in the country and overseas.

As described above, according to an aspect, the predetermined-area management system stores the image identification information and the predetermined-area information in association with each other and transmits, to the communication terminal, the predetermined-area information that is associated with the image identification information received from the communication terminal, whereby the communication terminal is capable of displaying the image data and the predetermined area in an associated manner.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A system that is configured to communicate with at least one communication terminal, which is a requesting communication terminal, out of a plurality of communication terminals the system comprising:
    a memory that stores
        (i) image identification information for identifying spherical image data for a spherical still image that is already stored at the requesting communication terminal, the spherical image data being previously captured by one of the plurality of communication terminals and shared with the other ones of the plurality of communication terminals, and
        (ii) a plurality of predetermined-area information for identifying and extracting a respective plurality of predetermined areas in the spherical image data that is generated and received from the plurality of communication terminals, without storing image data of the predetermined areas themselves, wherein the image identification information and the predetermined-area information are stored in association with each other;
    a receiver that receives a request that includes the image identification information from the requesting communication terminal;
    circuitry configured to search the memory by using the received image identification information so as to retrieve all of the predetermined-area information associated with the image identification information; and
    a transmitter that transmits, to the requesting communication terminal, the retrieved predetermined-area information,
    wherein the requesting communication terminal is configured to generate and display a plurality of thumbnail image data corresponding to the plurality of communication terminals in association with displaying the spherical image data based on the retrieved predetermined-area information.

2. The system according to claim 1, wherein
    the receiver receives the image identification information and predetermined-area information that are transmitted from a predetermined communication terminal,
    the circuitry determines whether a combination of the received image identification information and the received predetermined-area information matches a combination stored in the memory, and
    the transmitter transmits a determination result obtained by the circuitry to the predetermined communication terminal.

3. The system according to claim 2, wherein
    when the determination result indicates that a matching combination is stored, the receiver again receives the image identification information and the predetermined-area information that are again transmitted from the predetermined communication terminal, and
    the memory stores the image identification information and the predetermined-area information that are received again in association with each other.

4. The system according to claim 1, wherein the spherical image data is data of a Mercator image.

5. The system according to claim 1, wherein the request communication terminal transmits new image data or a comment for the spherical image data to the system.

6. A communication method performed by a system configured to communicate with at least one communication terminal, which is a requesting communication terminal, out of a plurality of communication terminals, the communication method comprising:
    storing, at a memory,
        (i) image identification information for identifying spherical image data for a spherical still image that is already stored at the requesting communication terminal, the spherical image data being previously captured by one of the plurality of communication terminals and shared with the other ones of the plurality of communication terminals, and
        (ii) a plurality of predetermined-area information for identifying and extracting a respective plurality of predetermined areas in the spherical image data that is generated and received from the plurality of communication terminals, without storing image data of the predetermined areas themselves, wherein the image identification information and the predetermined-area information are stored in association with each other;
    receiving, by a receiver, a request that includes the image identification information from the requesting communication terminal;
    searching, by circuitry, the memory by using the received image identification information so as to retrieve all of the predetermined-area information associated with the image identification information; and
    transmitting, by a transmitter, to the requesting communication terminal, the retrieved predetermined-area information,
    wherein the requesting communication terminal is configured to generate and display a plurality of thumbnail image data corresponding to the plurality of communication terminals in association with displaying the spherical image data based on the retrieved predetermined-area information.

7. A non-transitory computer-readable medium having computer readable program codes embodied in the medium for processing information in a system configured to communicate with at least one communication terminal, which is a requesting communication terminal, out of a plurality of communication terminals, and the program codes when executed cause the system to execute a method comprising:

storing, at a memory,
- (i) image identification information for identifying spherical image data for a spherical still image that is already stored at the requesting communication terminal, the spherical image data being previously captured by one of the plurality of communication terminals and shared with the other ones of the plurality of communication terminals, and
- (ii) a plurality of predetermined-area information for identifying and extracting a respective plurality of predetermined areas in the spherical image data that is generated and received from the plurality of communication terminals, without storing image data of the predetermined areas themselves, wherein the image identification information and the predetermined-area information are stored in association with each other;

receiving, by a receiver, a request that includes the image identification information from the requesting communication terminal;

searching, by circuitry, the memory by using the received image identification information so as to retrieve all of the predetermined-area information associated with the image identification information; and transmitting, by a transmitter, to the requesting communication terminal, the retrieved predetermined-area information, wherein the requesting communication terminal is configured to generate and display a plurality of thumbnail image data corresponding to the plurality of communication terminals in association with displaying the spherical image data based on the retrieved predetermined-area information.

8. The system according to claim 1, wherein the predetermined areas each indicate a predetermined area in the spherical image data based on an angle of view which originates at the center of a virtual sphere corresponding to the spherical image data.

* * * * *